US012742277B2

(12) United States Patent
Gauthier et al.

(10) Patent No.: US 12,742,277 B2
(45) Date of Patent: Sep. 22, 2026

(54) REGENERABLE SYSTEM AND METHOD FOR FILTERING MICROFIBRES FROM A WASTE LIQUID

(71) Applicant: IFP Energies nouvelles, Rueil-Malmaison (FR)

(72) Inventors: Thierry Gauthier, Rueil-Malmaison Cedex (FR); Matthieu Dreillard, Rueil-Malmaison Cedex (FR); Pierre Louis Carrette, Rueil-Malmaison Cedex (FR); Etienne Combe-Laboissiere, Rueil-Malmaison Cedex (FR); Jeremy Maillet, Rueil-Malmaison Cedex (FR); Christophe Reux, Rueil-Malmaison Cedex (FR); Caroline De Faria Barros, Rueil-Malmaison Cedex (FR); Laurent Peyret, Rueil-Malmaison Cedex (FR); Mathieu Dubloc, Rueil-Malmaison Cedex (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 904 days.

(21) Appl. No.: 17/916,178

(22) PCT Filed: Mar. 23, 2021

(86) PCT No.: PCT/EP2021/057473

§ 371 (c)(1), (2) Date: Sep. 30, 2022

(87) PCT Pub. No.: WO2021/197937

PCT Pub. Date: Oct. 7, 2021

(65) Prior Publication Data

US 2023/0149835 A1 May 18, 2023

(30) Foreign Application Priority Data

Apr. 3, 2020 (FR) ...................................... 2003351
Feb. 2, 2021 (FR) ...................................... 2101003

(51) Int. Cl.
*D06F 39/10* (2006.01)
*B01D 24/12* (2006.01)
(Continued)

(52) U.S. Cl.
CPC ............ *D06F 39/10* (2013.01); *B01D 24/12* (2013.01); *B01D 24/4631* (2013.01); *D06F 33/42* (2020.02)

(58) Field of Classification Search
CPC .... B01D 24/12; B01D 24/4631; B01D 29/68; D06F 33/42; D06F 39/10
(Continued)

(56) References Cited

U.S. PATENT DOCUMENTS 4,322,299 A * 3/1982 Scholten .............. B01D 24/007 210/794
4,906,367 A 3/1990 Villagomez
2013/0220913 A1* 8/2013 Cohen .................. B01D 24/002 210/275

FOREIGN PATENT DOCUMENTS

CN 104514122 A * 4/2015 ............. D06F 39/10
CN 104514122 B 1/2017
(Continued)

OTHER PUBLICATIONS

International Search Report (ISR) from international application No. PCT/EP2021/057473 mailed May 28, 2021.

*Primary Examiner* — Bobby Ramdhanie
*Assistant Examiner* — William Addison Geisbert
(74) *Attorney, Agent, or Firm* — FITCH, EVEN, TABIN & FLANNERY, LLP

(57) ABSTRACT

A regenerable system for filtration of microfibres contained in a liquid effluent from a textile treatment device comprises
(Continued)

at least one enclosure (10) in which a granular medium (30) is arranged, means (100) for passage by percolation of the liquid effluent through the granular medium, means (110) for discharging the liquid effluent under granular medium (30), and means (120) for connection to means for regeneration by fluidization of granular medium (30). A method for filtering microfibres contained in a liquid effluent from a textile treatment device can be implemented by means of such a system.

19 Claims, 15 Drawing Sheets

(51) Int. Cl.
*B01D 24/46* (2006.01)
*D06F 33/42* (2020.01)

(58) Field of Classification Search
USPC .......................................................... 210/263
See application file for complete search history.

(56) References Cited

FOREIGN PATENT DOCUMENTS

| | | | | | |
|---|---|---|---|---|---|
| EP | 2816150 | A2 | | 12/2014 | |
| EP | 3187642 | A1 | | 7/2017 | |
| FR | 2742352 | A1 | * | 6/1997 | ........... B01D 29/118 |
| GB | 2429416 | A | * | 2/2007 | ............. B01D 24/10 |
| WO | 2017/173215 | A1 | | 3/2017 | |
| WO | 2019/017848 | A1 | | 7/2017 | |

* cited by examiner

[Fig 2b]
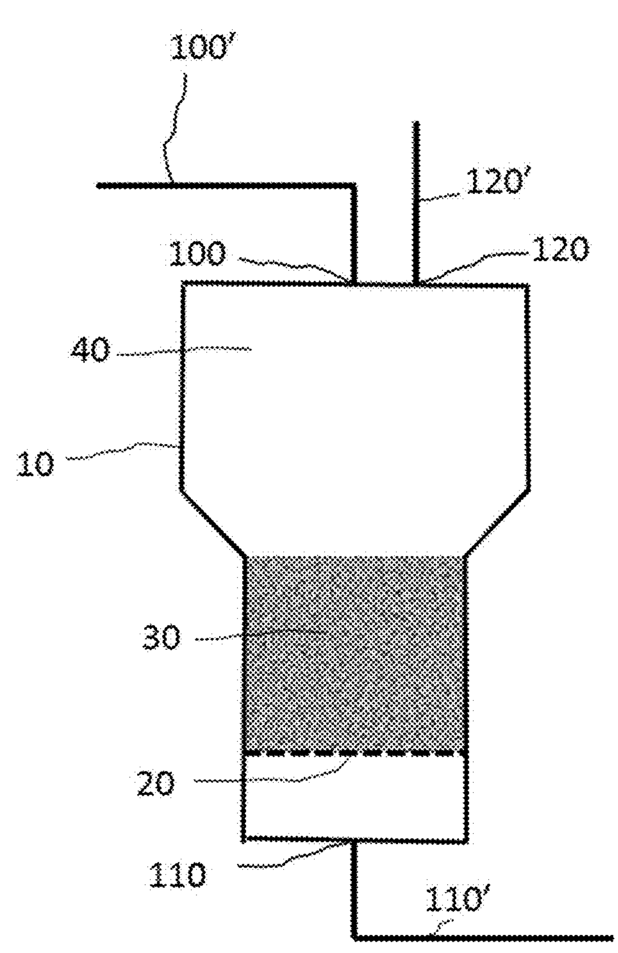

[Fig 2c]
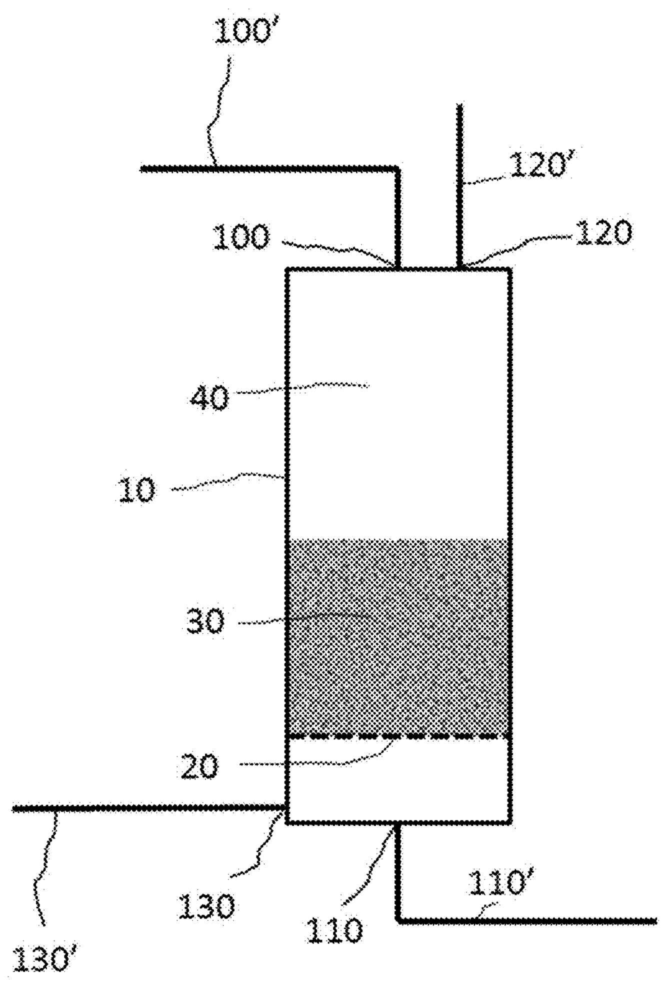

[Fig 2d]
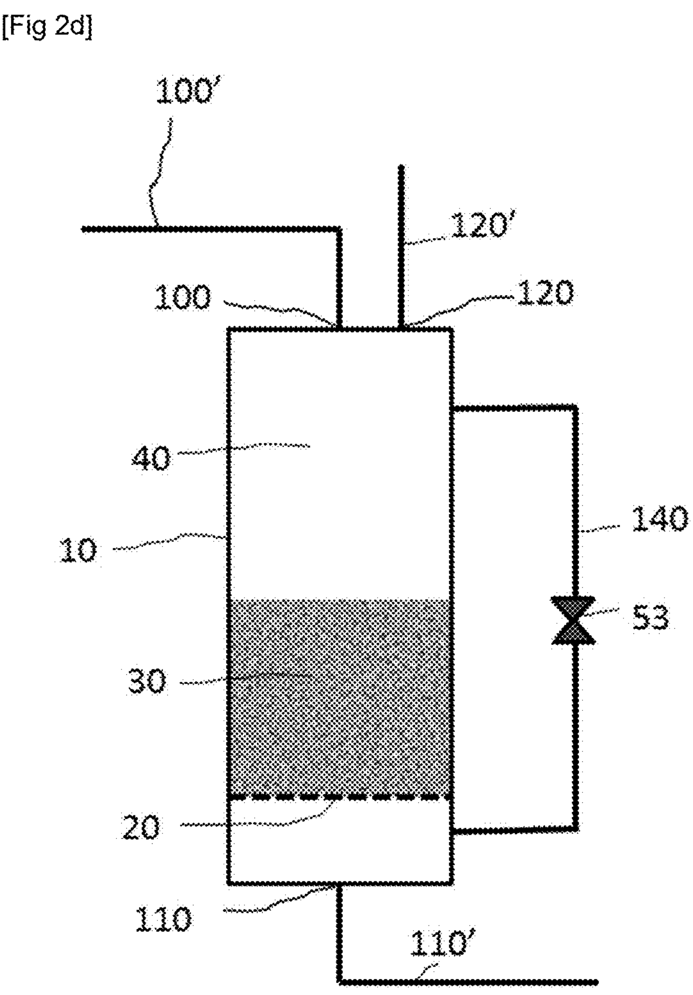

[Fig 5]
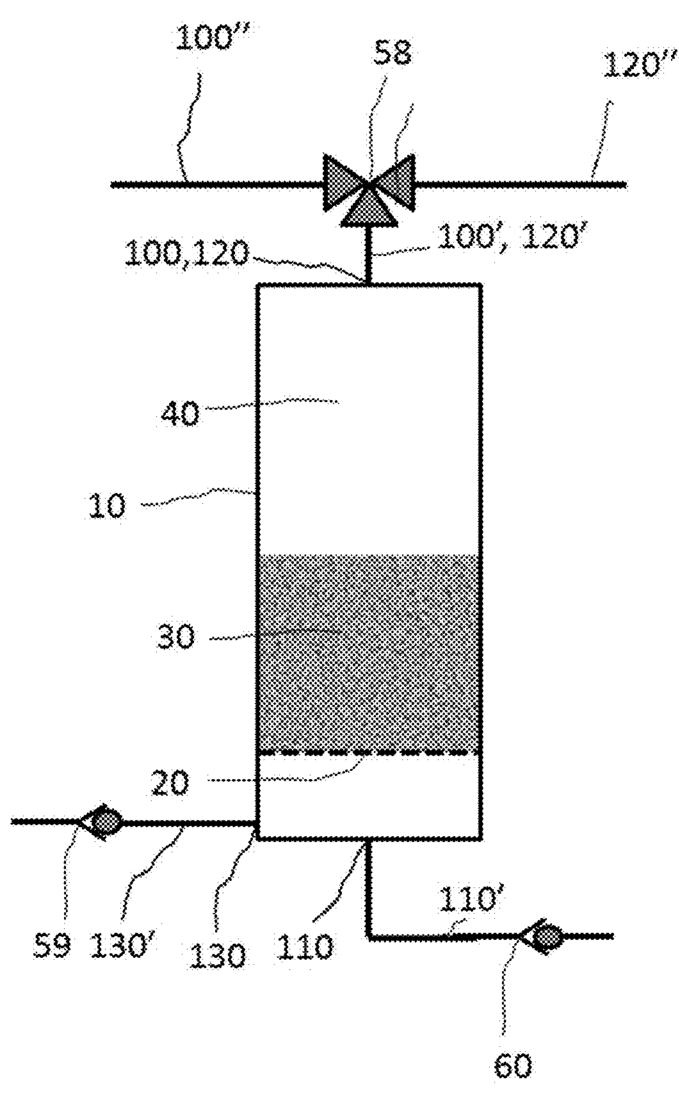

[Fig 6]
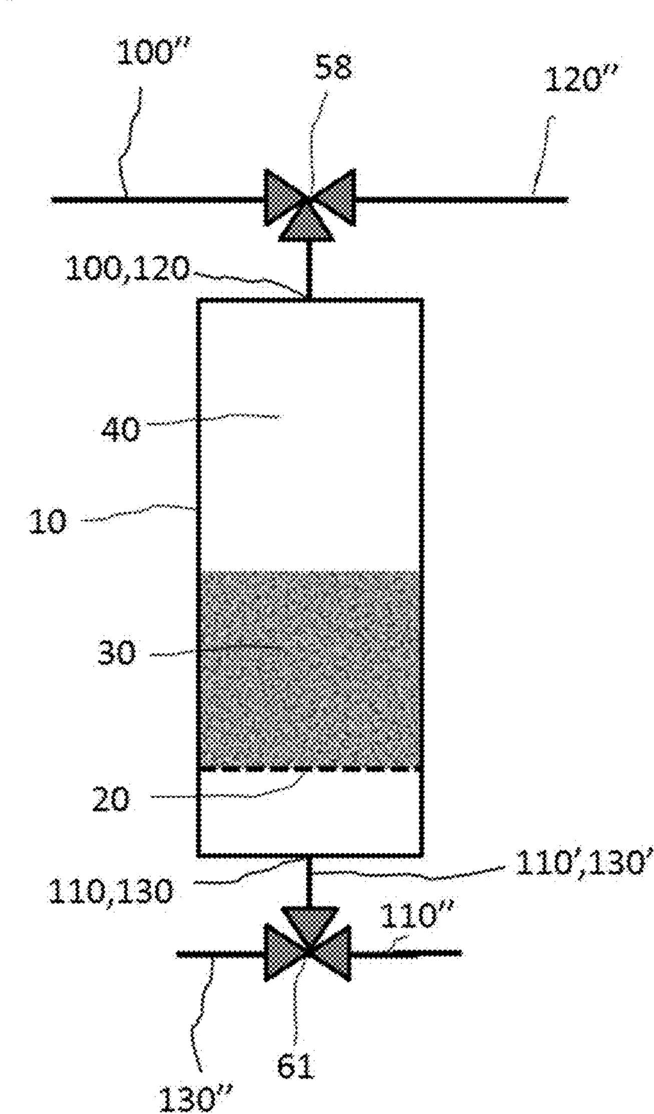

[Fig 7a]
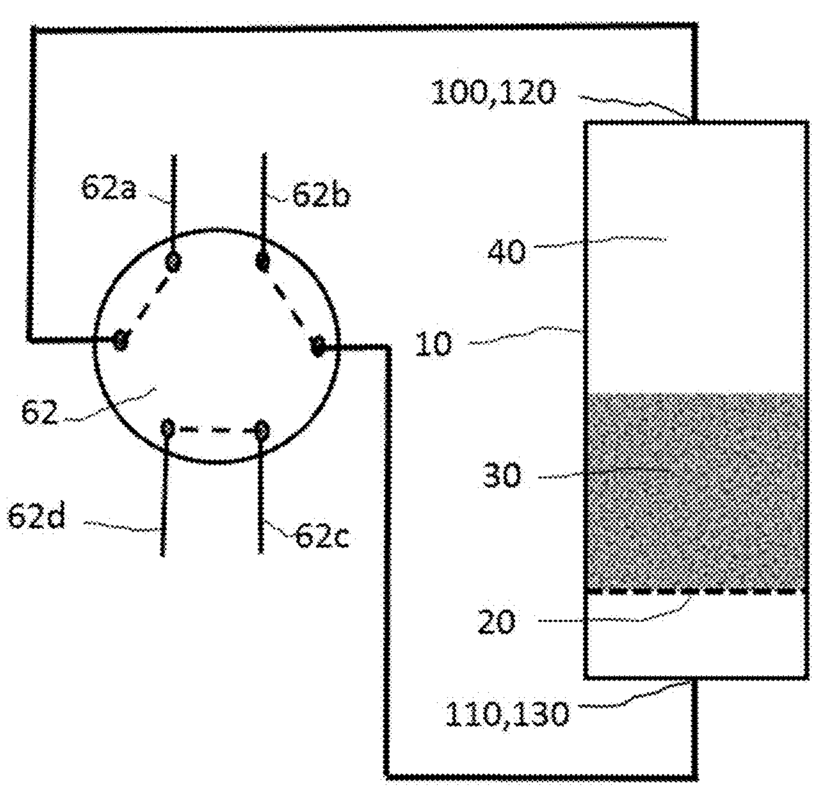

[Fig 7b]
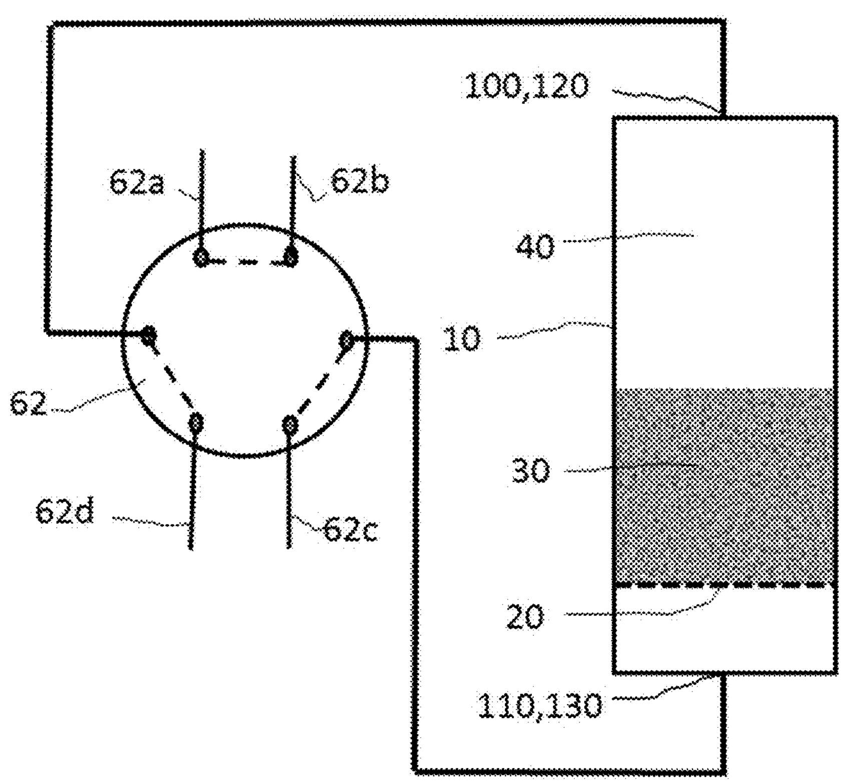

[Fig 8]
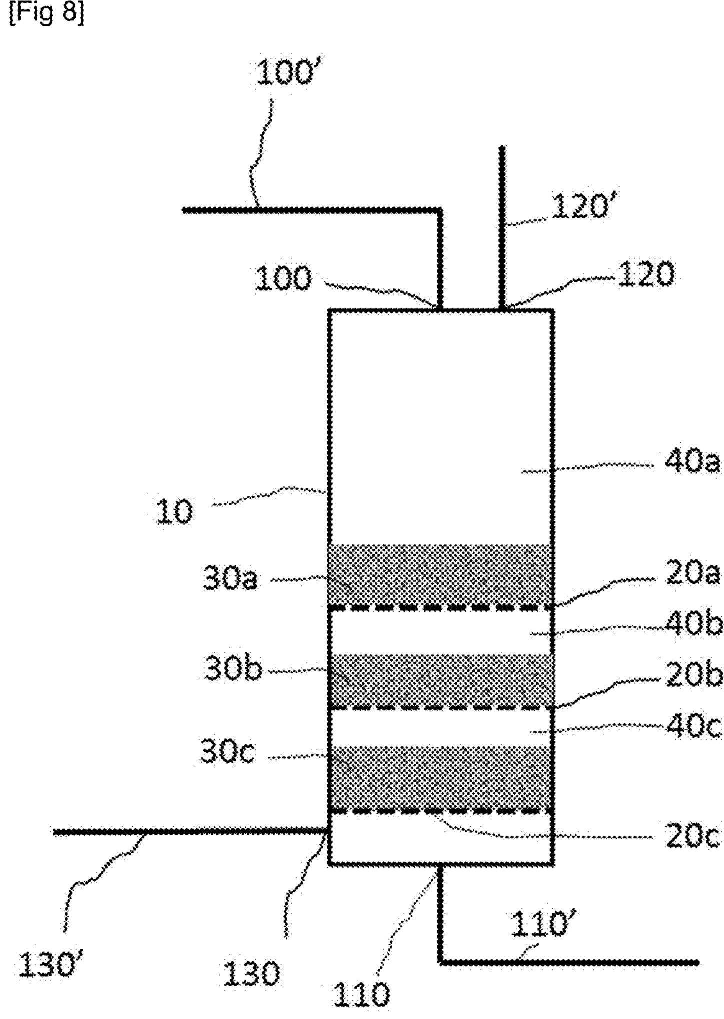

[Fig 9]
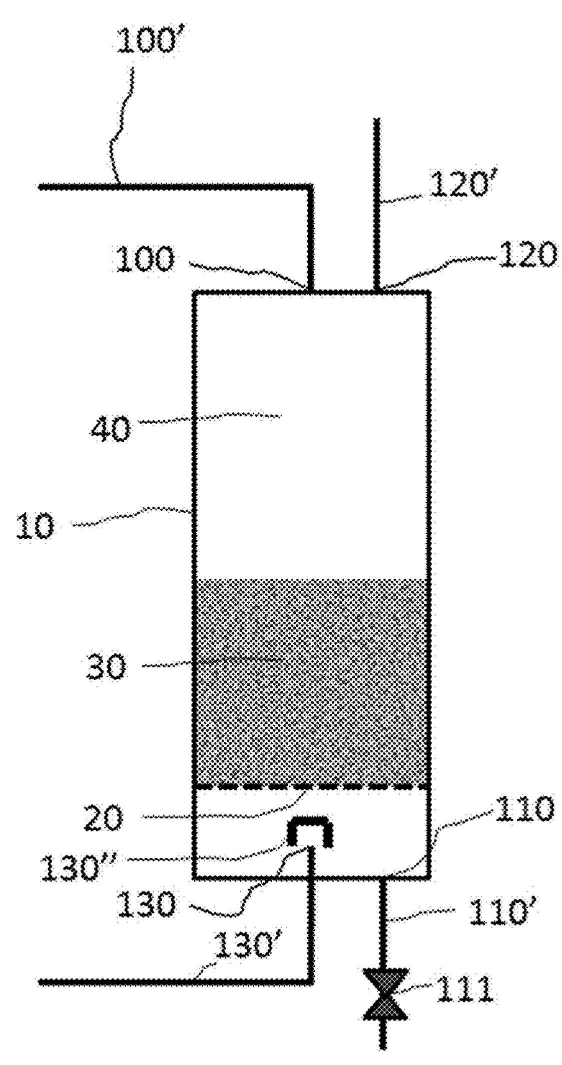

REGENERABLE SYSTEM AND METHOD FOR FILTERING MICROFIBRES FROM A WASTE LIQUID

CROSS-REFERENCE TO RELATED APPLICATIONS

This application is a U.S. national phase application filed under 35 U.S.C. § 371 of International Application No. PCT/EP2021/057473, filed Mar. 23, 2021, designating the United States, which claims priority from French Application No. 2003351, filed Mar. 25, 2020 and French Application No. 2101003, filed Feb. 2, 2021, which are incorporated herein by reference in their entireties.

FIELD OF THE INVENTION

The present invention relates to the field of elimination of microfibres contained in a drain liquid from a textile treatment device, such as a washing machine, a laundry (industrial or not), a device for textile dyeing, or a device for waterproofing textiles. Recent studies show that between 20% and 35% of the microplastics found in the marine environment are microfibres from synthetic clothing. These microplastics are mainly released when washing synthetic textiles in form of microfibres, due to the abrasion of fabrics during the wash cycle. Over 700,000 microscopic fibres can thus be released in the wastewater each time a domestic washing machine is used, with a large number thereof likely to pass through the wastewater treatment and thus to end up in the environment.

More precisely, according to some studies, the amount of fibres released during textile washing could correspond to an amount ranging from 0.005 to 0.02 wt. % of the textiles washed, depending on the nature of the textile. Other studies consider that the release of fibres during textile washing could even correspond to an amount ranging from 0.02 to 0.1 wt. % of the textiles washed, depending on the nature of the textile.

It is therefore also a major public health issue since these microplastics are found in the water and the food that we consume. According to the latest estimate, a human being ingests an average of 5 grams of plastic each week, i.e. the weight of a credit card.

Besides, on 30 Jan. 2020, France passed an anti-waste and circular economy law wherein Article 10 bis AAB provides that new washing machines must be fitted with a plastic microfibre filter from 1 Jan. 2025. France is the first country in the world to take such a step.

BACKGROUND OF THE INVENTION

Document U.S. Pat. No. 4,906,367 describes a flexible woven filter positioned at the drain pipe of a washing machine. The main impurities such as hairballs are retained by this filter, which needs to be physically removed to be cleaned when clogged. The filter described in this document was initially designed to protect wastewater pipes, and not to retain objects as small as microfibres. Indeed, the pores of this filter are not fine enough to enable efficient retention. Using smaller pores for this type of filter would rapidly lead to clogging and too short filter life.

Also known is patent application WO-2017/173,215, which describes a spherical plastic object placed in a washing machine drum with the clothes to be washed and allowing in-situ capture of the released fibres thanks to a plurality of protrusions. The geometry of these protrusions is however not yet designed to capture small objects such as microfibres, the retention efficiency for microfibres longer than 100 μm being only 26%.

Patent application WO-2017/121,862 describes a woven filtering plastic bag that accommodates the clothes to be washed and can retain part of the textile microfibres. The bag has perforations with diameter ranging between 5 and 200 μm, preferably 50 μm. Although the problem of microfibres is addressed here, it is questionable whether putting the laundry in a bag does not affect the washing thereof. Notably, dirt particles larger than the microfibres will not be properly evacuated. The mechanical action of the drum is also likely to be less efficient if the clothes are in a bag. The document does not detail how some microfibres will not leak out again when removing the laundry from the bag.

Patent application WO-2019/017,848 describes a system for retaining microfibres, positioned at the outlet of a washing machine and based on microfiltration membranes made of polyethylene nanofibres. The membrane preferably has a pore diameter around 50 μm and it is optionally doped with aluminium oxide nanoparticles allowing microfibre adsorption to be improved. The membrane filter described in this document has a certain mobility, which provides an anti-clogging function. However, despite this anti-clogging function, the cartridge containing the microfiltration membrane marketed to date has a life span of 20 wash cycles. Using such a filter therefore requires a significant amount of consumables, and thus a not insignificant consumption of plastic material for manufacturing them. Furthermore, the plastic nanofibres that make up the membrane can present a risk of deterioration during use, and therefore of discharge with the wastewater.

The present invention relates to a system and to a method for filtering microfibres (plastic or other) at the outlet of textile treatment devices, in an efficient and inexpensive manner requiring few consumables. Indeed, the system according to the invention can be regenerable, which allows to greatly limit the periodicity of changing the filter of the filtration system according to the invention. The system and the method according to the invention can further enable collection of at least part of the microfibres at the outlet of a textile treatment device, for possible subsequent recycling.

SUMMARY OF THE INVENTION

The invention relates to a system for filtering microfibres contained in a liquid effluent from a textile treatment device, said system being intended to be connected to a drain pipe of said textile treatment device. Said system according to the invention comprises at least:

- an enclosure comprising a granular medium occupying a portion of the space of said enclosure, said granular medium being arranged on a support so as to leave a free volume in said enclosure above said granular medium, said support being permeable to at least said liquid effluent,
- means allowing passage by percolation of said liquid effluent through said granular medium, comprising at least one opening provided in said enclosure (10) and arranged above said granular medium,
- means for discharging said liquid effluent, comprising at least one opening provided in said enclosure and arranged under said support of said granular medium,
- means for connection to means for regeneration by fluidization of said granular medium, comprising at least one opening provided in said enclosure and arranged above said granular medium.

According to an implementation of the invention, said means for connection to said means for regeneration by fluidization of said granular medium can comprise an additional opening provided in said enclosure and arranged under said support of said granular medium, said additional opening of said connection means being able to be connected to means for gas intake or gas insufflation.

According to an implementation of the invention, said means for discharging said liquid effluent can comprise a circuit external to said enclosure, connected to said enclosure to bypass said granular medium in case of accumulation of said liquid effluent in said free volume of said enclosure above said granular medium.

Alternatively, said means for discharging said liquid effluent can comprise a pipe running through at least said granular medium so as to bypass said granular medium in case of accumulation of said liquid effluent in said free volume of said enclosure above said granular medium, said pipe being preferably provided with a deflector in the upper part thereof.

According to an implementation of the invention, said circuit (140) external to said enclosure can further comprise a liquid detector, preferably connected to an alarm. According to an implementation of the invention, said pipe (140) of said means (110) for discharging said liquid effluent can further comprise a liquid detector, preferably connected to an alarm.

According to an implementation of the invention, said system can further comprise means for controlling said means for passage by percolation of said liquid effluent through said granular medium and/or said means for discharging said liquid effluent, and/or said means for connection to said means for regeneration by fluidization of said granular medium.

According to an implementation of the invention, said control means can comprise at least one 2-way valve and/or at least one 3-way valve and/or at least one non-return valve and/or a rotary 6-way valve.

According to an implementation of the invention, said system can further comprise a settling chamber and/or a cyclone separation chamber and/or an accumulation chamber for said liquid effluent, arranged upstream from said enclosure and connected to said means for passage by percolation of said liquid effluent through said granular medium.

According to an implementation of the invention, said system can further comprise means for injecting at least one flocculant agent into said liquid effluent, said injection means being arranged for injection of said at least one flocculant agent into said liquid effluent upstream from said granular medium.

According to an implementation of the invention, said granular medium can comprise sand particles, crushed glass beads or raw glass beads, particles based on natural or synthetic zeolite, alumina, or resins or plastic.

According to an implementation of the invention, said granular medium can comprise particles with size ranging between 0.1 mm and 2 cm for at least 80 wt. % of said particles, preferably ranging between 0.3 mm and 2.5 mm for at least 90 wt. % of said particles.

According to an implementation of the invention, a liquid distributor can be arranged between said granular medium (30) and said opening (100) of said means (100) for passage by percolation of said liquid effluent through said granular medium (30) and/or, when said means for regeneration by fluidization of said granular medium (30) comprise gas suction means, a gas distributor can be arranged between said granular medium (30) and an opening intended for intake of the gas of said gas suction means.

The invention further relates to a method for filtering microfibres contained in a liquid effluent from a textile treatment device, and said method can be implemented by means of a system for filtering microfibres according to any one of the embodiments described above. Said method comprises at least the following steps:

A) carrying out at least one phase of filtering said microfibres, said filtration phase comprising at least one passage by percolation of said liquid effluent through said granular medium through the agency of at least said means for passage by percolation of said liquid effluent through said granular medium, and discharge of said filtered liquid effluent through the agency of at least said means for discharging said liquid effluent, B) carrying out a phase of regeneration by fluidization of said granular medium by connecting said means for connection to said means for regeneration by fluidization of said granular medium with said means for regeneration by fluidization of said granular medium.

According to an implementation of the invention, step A) can be repeated between 50 and 150 times, preferably about 100 times, prior to carrying out step B).

According to an implementation of the invention, said method can comprise, prior to step A), a step of pretreatment of said liquid effluent, said step of pretreatment of said liquid effluent comprising at least one injection of at least one flocculant agent into said liquid effluent and/or at least one settling of said liquid effluent and/or at least one cyclone separation of said liquid effluent.

According to an implementation of the invention, said method can comprise, prior to step B), a phase of draining said granular medium, carried out through the agency of gas suction means connected to said system so as to generate a descending gas flow through said granular medium, and/or a phase of drying said granular medium, carried out through the agency of means for increasing the temperature of said granular medium.

According to an implementation of the invention, said filtration and regeneration phases can be controlled by said means for controlling said microfibre filtration system as described above.

According to an implementation of the invention, said method can further comprise at least one step subsequent to said phase of regeneration by fluidization, consisting in collecting said microfibres from said regeneration phase, preferably by means of a cyclone chamber and/or of a membrane filter arranged downstream from said means for regeneration by fluidization of said granular medium.

The invention also relates to a textile washing device, comprising at least a system for filtration of the microfibres contained in a liquid effluent according to any one of the embodiments described above.

BRIEF DESCRIPTION OF THE FIGURES

FIG. 1 shows a microfibre filtration system according to a first implementation of the invention, FIGS. 2*a* to 2*f* show a microfibre filtration system according to different variants of the first embodiment of the invention, FIGS. 3 to 6 and 7*a* to 7*b* show various embodiments of means for controlling the microfibre filtration system according to the invention, FIG. 8 shows a microfibre filtration system comprising a granular medium in form of three staged particle beds, and FIG. 9 shows a microfibre filtration system capable of carrying out a granular medium drainage phase, followed by a granular medium drying phase, prior to a granular medium regeneration phase.

DETAILED DESCRIPTION OF THE INVENTION

The invention relates to a system and to a method for filtration of microfibres contained in a liquid effluent from a textile treatment device.

"Microfibres" are understood to be particles from woven or knitted materials, consisting of natural (cotton, wool, . . . ) or synthetic (polyester, polyamide, acrylic, . . . ) fibres, such as clothes or fabrics used in the clothing sector or for any other application (sheets, curtains, etc.) by private individuals or in the industry. Microfibres, normally entrained in the wastewater of a washing machine, generally have an elongated shape, with diameters usually ranging between 0.1 and 50 microns. The length of the fibres can range from some fibre diameters to several mm, depending on the nature and the condition of the previously washed materials.

A "textile treatment device" is understood to be, in particular, a textile washing device, for example an individual washing machine, for household or commercial use, a set of washing machines (in laundries for example), an industrial laundry (staffed laundry for example), etc. A textile treatment device according to the invention however generally comprises any device providing contact between a textile and a liquid, the liquid being subsequently separated from the textile, such as a textile dyeing device or a textile waterproofing device.

A "liquid effluent from at least one textile treatment device" is understood to be the liquid obtained after draining (for example the liquid after washing and/or rinsing and/or spinning in the case of a textile washing device) a textile treatment device. It is referred to hereafter in an equivalent manner as "drain liquid". Conventionally, the microfibre load in liquid effluents at the outlet of textile treatment devices is generally limited, with contents ranging between 0.1 and 1000 ppm by weight, generally between 1 and 100 ppm by weight.

The system according to the invention is intended to be connected to a drain pipe of a textile treatment device. The system according to the invention can be equally installed outside a textile treatment device (at the end of the drain pipe of the textile treatment device) or inside a textile treatment device (on a portion of the drain pipe of the textile treatment device).

The general principle of the filtration system according to the invention consists in filtering the microfibres contained in a liquid effluent from a textile treatment device, by percolation of this liquid effluent through a granular medium arranged in an enclosure. The system according to the invention can be advantageously connected to means for regeneration by fluidization of the granular medium, so as to eliminate the microfibres that have settled in the granular medium.

The method according to the invention generally comprises at least one step of filtering the microfibres contained in a liquid effluent from a textile treatment device, by percolation of this liquid effluent through a granular medium arranged in an enclosure, followed by a step of regeneration by fluidization of the granular medium. Preferably, the regeneration step is carried out by means of an ascending gas flow through the granular medium, the ascending gas being preferably air.

More precisely, the system according to the invention comprises an enclosure wherein a portion of the space is occupied by a granular medium, this granular medium being surmounted by a free volume in the enclosure. According to the invention, the granular medium is arranged on at least one support permeable to at least the liquid effluent, and therefore to gases in general (i.e. all gases), in particular the gas that can be used for regeneration of the granular medium by fluidization by means of a gas as described hereafter. According to an implementation of the invention, the support of the granular medium can be a grid whose meshes are dimensioned to retain the granular medium while allowing passage of at least the liquid effluent.

The enclosure can be of cylindrical or parallelepiped shape, and it is preferably elongated along the axis of the liquid effluent stream flowing through the enclosure (i.e. a vertical axis, as described hereafter). Advantageously, the section of the enclosure can be constant along the part of the enclosure in contact with the granular medium, and the section can be larger, or even increasing, in the part of the enclosure above the granular medium. The free volume above the granular medium is thus increased, which allows, on the one hand, to avoid the risk of backflow of the liquid effluent in case of accumulation above the granular medium (which may occur in case of granular medium clogging) and, on the other hand, to improve regeneration of the granular medium, by increasing the volume available for expansion by fluidization of the granular medium and by decreasing the velocity of the regeneration fluid above the granular medium (which limits entrainment of the particles of the granular medium). The granular medium according to the invention comprises at least one particle bed as described hereafter.

The system according to the invention further comprises means for passage by percolation of the effluent liquid through the granular medium. In other words, according to the invention, the granular medium is traversed by a vertical downward flow of the liquid effluent. This is made possible in the system according to the invention by at least one opening for passage of the liquid effluent, provided in the upper part of the enclosure, above the granular medium. The term "upper part" is used by reference to the downward direction of flow of the liquid effluent through the enclosure. Thus, this opening of the means providing passage by percolation of the liquid effluent through the granular medium allows arrival of the fibre-laden liquid effluent above the granular medium. Advantageously, the opening of the means allowing passage by percolation of the liquid effluent through the granular medium is provided in the upper wall of the enclosure of the system according to the invention, preferably in a central part of this upper wall (for example in a zone centered on the barycentre of the upper wall, whose radius corresponds to 30% of the smallest dimension of the upper wall). An opening provided in a central part of the upper wall of the enclosure enables more homogeneous distribution laterally of the liquid effluent in relation to an off-centre opening.

Furthermore, the system according to the invention comprises means for discharging the liquid effluent, these discharge means comprising at least one opening provided in the lower part of the enclosure, and under the support for the granular medium. The term "lower part" is used by reference to the downward direction of flow of the liquid effluent through the enclosure. Thus, this opening of the liquid effluent discharge means provides an outlet for the liquid effluent filtered by the granular medium to the lower part of the enclosure, below the support of the granular medium. Advantageously, the opening of the liquid effluent discharge means is provided in the lower wall of the enclosure of the system according to the invention, so as to avoid accumulation of the filtered liquid effluent in the bottom of the enclosure. According to an implementation of the invention, this opening can be connected to a wastewater discharge system such as a siphon upstream from a mains drainage device. Depending on the geometric configuration, a lift pump can be used to provide discharge of the filtered effluent.

The system according to the invention further comprises means for connection to means for regeneration by fluidization of the granular medium, comprising at least one opening provided in the upper part of the enclosure, above the granular medium. The means for regeneration by fluidization of the granular medium are intended to prevent clogging of the granular medium, which may occur through accumulation of the filtered microfibres in the granular medium. In general, fluidization of a granular medium is conventionally obtained by upward passage of a liquid or a gas through a granular medium. Preferably, the means for regeneration by fluidization of the granular medium that can be connected to the system according to the invention are means for regeneration by gas fluidization. Gas fluidization is understood to be fluidization of the particles of the granular medium by a gas. Upward passage of a gas sets the particles of the granular medium in motion, which results in an expansion of the granular medium in the free volume above the granular medium, and the fibres are entrained by the ascending gas flow. According to an implementation of the invention, the system according to the invention can be connected, via the connection means according to the invention, to granular medium regeneration means in form of gas suction means (such as a vacuum cleaner for domestic or industrial use) and/or gas insufflation means (such as air compression or overpressure systems). According to this implementation, the gas used for fluidizing and regenerating the granular medium can enter the system through the opening of the liquid effluent discharge means provided in the lower part of the enclosure.

The means for connection to the means for regeneration by fluidization of the granular medium of the system according to the invention comprise at least one opening arranged above the granular medium, in the upper part of the enclosure. This opening allows discharge of the microfibres released from the granular medium by fluidization. Preferably, this opening of the means for connection to the means for regeneration by fluidization of the granular medium is provided in the upper wall of the enclosure of the system according to the invention, preferably in a central part of this upper wall (for example located in a zone centered on the barycentre of the upper wall, whose radius corresponds to 30% of the smallest dimension of the upper wall). An opening provided in a central part of the upper wall of the enclosure allows more homogeneous regeneration laterally of the granular medium in relation to an off-center opening. As described in embodiments hereafter, the opening of the means for passage by percolation of the liquid effluent through the granular medium and the opening of the means for connection to means for regeneration by fluidization of the granular medium can be common, and their function of either filtration or regeneration can then be controlled by control means such as valves comprising at least three ways. According to an implementation of the invention, the opening of the means for passage by percolation of the liquid effluent through the granular medium and the opening of the means for connection to means for regeneration by fluidization of the granular medium can be common, and their function of either filtration or regeneration can be controlled manually or in an automated manner.

The means for regeneration by fluidization of the granular medium allow the service life of the system according to the invention to be increased. Advantageously, the means for regeneration by fluidization of the granular medium are configured to eliminate the microfibres from the granular medium when the cumulative microfibre volume represents 0.1 to 10% of the porosity of the granular medium, preferably 0.5 to 5% of the porosity of the granular medium. It is thus possible to carry out a hundred regeneration phases before replacing the granular medium of the system according to the invention.

Advantageously, a grid can be arranged in the enclosure, between the opening of the means for passage by percolation of the liquid effluent through the granular medium and the granular medium, the size of the openings of the grid being smaller than the size of the particles of the granular medium. This grid allows to retain within the enclosure the particles of the granular medium during regeneration by fluidization. Advantageously, such a grid can also enable more homogeneous distribution of the liquid effluent on the granular medium, thus improving the filtering quality of the system according to the invention. Advantageously, a jet regulator can also be arranged under the opening of the means for passage by percolation of the liquid effluent through the granular medium, allowing introduction of the liquid effluent so as to disperse it and thereby preventing too strong a liquid effluent jet from impacting the granular medium. Advantageously, a liquid distributor can further be arranged between the opening of the means for passage by percolation of the liquid effluent through the granular medium and the granular medium. In general, a liquid distributor provides homogeneous distribution of a liquid. According to an implementation of the invention, the liquid distributor can be a perforated liquid-retaining plate. Such a distributor allows the liquid to be evenly distributed over the section of the granular medium.

Figure 1:
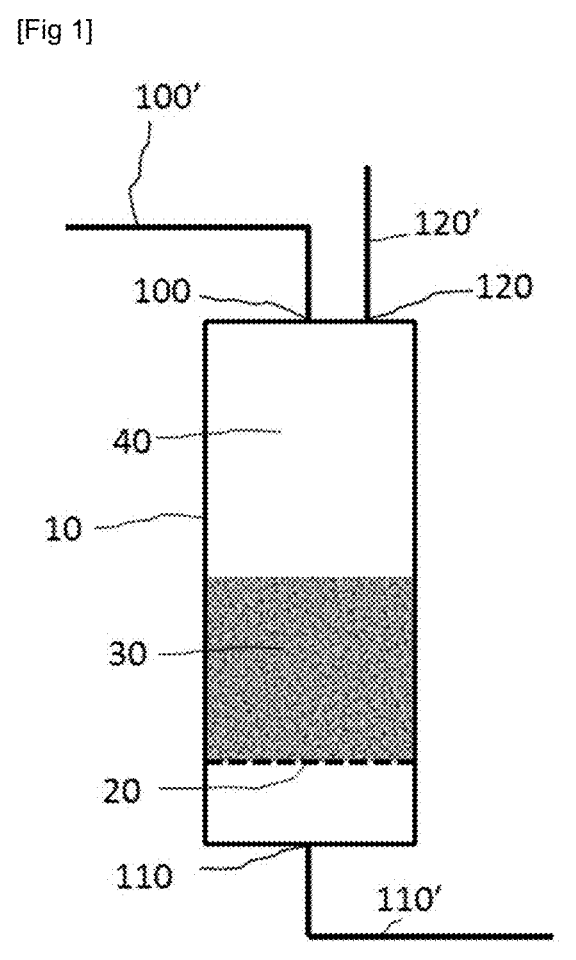

FIG. 1 schematically illustrates, by way of non-limitative example, a first embodiment of the system according to the invention. According to this design, the microfibre filtration system consists of a cylindrical enclosure 10 provided with a support 20 supporting a granular medium 30 consisting of a particle bed, and surmounted by a free volume 40 allowing to contain the accumulation of drain liquid during filtration and/or to contain an expansion of the particles of bed 30 that is fluidized during regeneration. The system according to this embodiment comprises, in the upper wall of enclosure 10, an opening 100 enabling delivery of the liquid effluent to be filtered, from a drain pipe 100'. The system according to this embodiment also comprises an opening 120 intended to be connected to means (not shown) for regeneration by fluidization of the granular medium (gas suction means for example), via a pipe 120'. The system further comprises an opening 110 allowing discharge of the filtered liquid effluent at the base of enclosure 10. This opening 110 is arranged under granular medium 30 and under granular medium support 20, and it can be connected via a pipe 110' to a wastewater discharge system (not shown), such as a siphon upstream from a mains drainage device.

FIG. **2*a* shows a variant of the embodiment of FIG. 1, identical in all respects to this first embodiment (the common elements will therefore not be described again), except for a grid 35 arranged between opening 120 for connection with the means for regeneration by fluidization (not shown) and granular medium 30, the size of the openings of grid 35 being smaller than the size of the particles of granular medium 30. This grid 35 allows to retain within enclosure 10 the particles of granular medium 30 during regeneration by fluidization. Advantageously, such a grid 35 can also provide more homogeneous distribution (jet regulator function) on granular medium 30 of the liquid effluent arriving through opening 100**, thus improving the filtering quality of the system according to the invention.

Figure 2A:
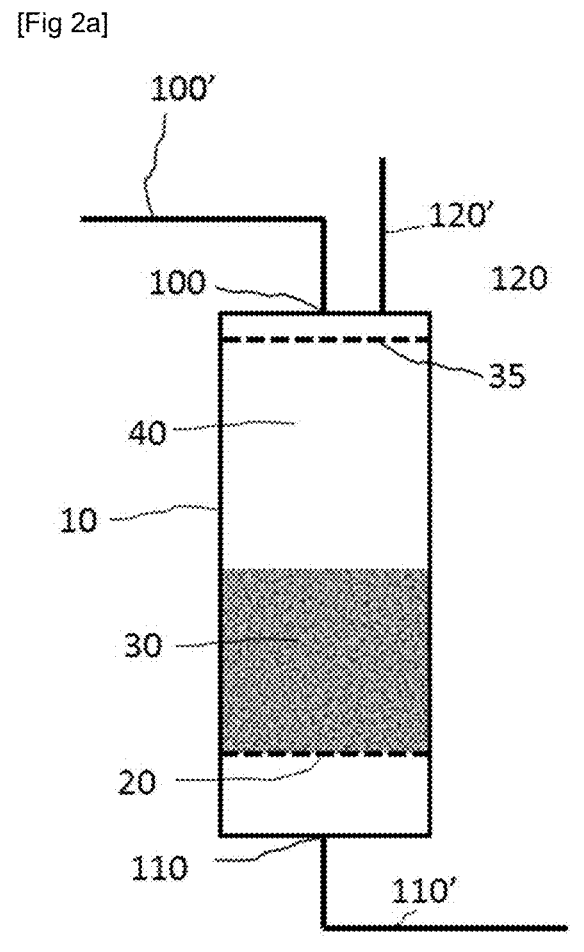

FIG. 2*b* shows another variant of the embodiment of FIG. 1, identical in all respects to this first embodiment (the common elements will therefore not be described again), except for the shape of enclosure 10, cylindrical in the lower part, frusto-conical in the intermediate part and cylindrical in the upper part thereof, the section of the upper part being larger than the section of the lower part. This particular geometry of enclosure 10 allows to increase the free volume above the granular medium, which makes it possible, on the one hand, to avoid the risk of liquid effluent backflow through openings 100, 120 provided in the upper part of the enclosure in case of accumulation above granular medium 30 (which may occur in case of granular medium clogging) and, on the other hand, to improve regeneration of the granular medium by increasing the volume available for expansion by fluidization of granular medium 30.

Thus, generally, the system and the method according to the invention allow filtration of the microfibres contained in a drain liquid, by retention of the microfibres in the pores of the granular medium traversed by the effluent. This type of filtration, referred to as "depth filtration" in other fields, is particularly suitable for capture of microfibres whose elongated shape facilitates retention in the tortuosity of the particle bed. It is noted that part of the microfibres can also be retained at the upper surface of the granular medium. The system according to the invention is also able to be connected to means for regeneration of the granular medium by fluidization, allowing to clean the filter according to the invention, and possibly to collect the microfibres retained in the pores of the granular medium.

The granular medium according to the invention comprises at least one particle bed, referred to hereafter in an equivalent manner as "filter bed" or "filtration bed". According to an implementation of the invention, the granular medium can comprise a plurality of staged particle beds, each held by a support that is not impervious to at least the liquid effluent (the support is therefore also not impervious to gas in general, and in particular to the gas used for regeneration of the granular medium by gas fluidization). Thus, in the system according to this implementation of the invention, the liquid effluent can percolate through each of the staged beds, from top to bottom.

The constituent material of the particles of a bed can be defined by its composition, by its grain size and by its density. Various particle types can be considered for a particle bed, as described below.

According to an implementation of the invention, the particles of a bed can be sand particles, crushed glass beads or raw glass beads, particles based on natural or synthetic zeolite, alumina, or resins or plastic. The aforementioned materials indeed have the advantage of being readily commercially available and they have properties (notably in terms of density, as described hereafter) suited to the intended application. According to an alternative, the particles of a bed can consist of a material whose surface properties have been modified to promote microfibre retention, by phenomena of physico-chemical affinity with textile microfibres (notably by modifying the electrostatic properties of the particles), or to limit the affinity of these particles with water (through a hydrophobic treatment, by coating for example particles such as glass beads with a Teflon film), which facilitates drying of the bed prior to regeneration. According to another implementation of the invention, a mixture of particles made from materials of different nature can be used for a single bed, or particles made from materials of different nature can be used from one bed to another if the granular medium is made up of a plurality of staged beds.

Generally, the grain size of the particles influences the filtration and regeneration capacity of the granular medium with respect to microfibres by acting upon the resistance to fluid flow. According to an advantageous implementation of the invention, the size of the particles can range, for at least 80 wt. % of the particles, between 0.1 mm and 2 cm, preferably, for at least 90 wt. % of the particles, between 0.3 mm and 2.5 mm. Alternatively or additionally, the average equivalent diameter of the granular medium particles (defined in relation to the size distribution by weight of the particles) can range between 0.3 mm and 1.35 mm, preferably between 0.4 mm and 0.8 mm. Advantageously, the proportion of particles with size less than 0.1 mm can be less than 5 wt. %. Advantageously, particles with different grain sizes can be used for a single bed, or particles with different grain sizes can be used from one bed to another when the granular medium is made up of a plurality of staged beds. Advantageously, in cases where the granular medium is made up of a plurality of staged beds, the beds can consist of particles with decreasing grain size in the direction of flow of the liquid effluent (i.e. downwards), so as to allow filtration of the larger fibres first, then of the increasingly smaller fibres. This implementation is particularly suitable when retention of the colloidal particles of very small size contained in the liquid effluent is desired. These colloidal particles can for example be formed from pigments and additives contained in textiles and detergent constituents. Capture of these colloidal particles is particularly indicated in the last bed of the enclosure in the direction of flow of the liquid effluent. This last bed in the direction of flow of the liquid effluent, which may be referred to as finishing bed, may possibly not be connected to regeneration means and may be subject to periodic replacement.

Generally, the density of the particles making up a particle bed affects the particle fluidization during regeneration (minimum velocity allowing the bed to be fluidized and pressure drop through the bed). The constituent materials of the particles described above (sand, glass, zeolite for example) generally have grain densities ranging between 1100 and 2800 kg/m$^2$ suited for regeneration by gas suction for example, even when the suction flow rate is moderate (with a domestic vacuum cleaner for example). Advantageously, it is possible to use hollow materials such as hollow glass or plastic beads whose grain density can be lower, which then allows the bed to be regenerated with lower fluid flow rates.

In general, the velocity of flow of the liquid effluent through a particle bed influences, on the one hand, the fibre retention quality and, on the other hand, the liquid effluent pressure drop through the particle bed. Advantageously, the system according to the invention can be dimensioned for the filtration velocity (superficial velocity of the liquid effluent in the particle bed) to range between 1 and 100 m/h, preferably between 5 and 50 m/h. Preferably, the system according to the invention can be dimensioned for the pressure drop provided by the clean particle bed (i.e. prior any filtration or after regeneration) to range between 500 and 100,000 Pa, preferably between 1000 and 10,000 Pa. The pressure drop under flow during passage of the liquid effluent through the particle bed (during first use or after regeneration) can be calculated using correlations described for example in the document (S. Rhode, "Opération polyphasique en génie des procédés", Ellipses Edition, 2019).

According to an implementation of the invention, an appropriate liquid effluent filtration velocity and pressure drop can be determined by means of a dimensioning known to specialists, performed at least according to the amount of liquid effluent to be filtered for a given time, the drain discharge pressure of the textile treatment device and the position of the system according to the invention on the portion of the pipe for draining the textile treatment device (notably the position of the filtration system according to the invention relative to the textile treatment device drain discharge and to the wastewater discharge system to which the filtration system according to the invention is connected during operation).

In general, the flow rate of the liquid effluent to be filtered depends on the washing capacity of the textile treatment device. For example, if the textile treatment device comprises several washing machines, the flow rate of the liquid effluent to be filtered depends on the number of washing machines and on the washing capacity (given in number of kg of laundry for example) of each washing machine. According to an implementation of the invention, for a domestic washing machine, capable of washing between 5 and 10 kg laundry, the system according to the invention can be dimensioned so as to have filtration rates ranging between 1 and 25 l/min, preferably between 3 and 15 l/min. The filtration rate depends on the filtration surface and on the filtration velocity described above.

According to an implementation of the invention where a single particle bed is arranged in the enclosure of the system according to the invention and for a washing machine washing between 5 and 10 kg laundry, the enclosure diameter can range between 5 and 50 cm inside diameter, preferably between 10 and 30 cm inside diameter so as to have optimum filtration velocities as defined above. Advantageously, the height of a particle bed can range between 0.5 and 5 times the equivalent diameter of the particle bed flow area, preferably between 0.7 and 2 times the equivalent diameter of the particle bed flow area, which leaves time for the microfibres to settle in the pores of the bed.

According to another implementation of the invention where the enclosure is of parallelepiped shape, the filtration system can be arranged at the rear or on the side of the washing machine. This parallelepiped shape is indeed particularly suitable for placing the system according to the invention outside a washing machine as it can thus fit more easily in the space available around the washing machine. The filtration system can preferably rest on the floor, or it can be attached to a wall or to an element of the washing machine. Advantageously, the enclosure dimensions are preferably selected so as to not exceed the height and the width of the washing machine if the system according to the invention is positioned at the rear of the washing machine, and to not exceed the height and the depth of the washing machine if the system according to the invention is positioned on a side of the washing machine. Preferably, in the case of a washing machine washing between 5 and 10 kg laundry, the height of the enclosure can be less than 85 cm, its width can be preferably less than 60 cm, its thickness can be preferably less than 20 cm, more preferably less than 15 cm and more preferably yet less than 10 cm.

Very preferably, the system according to the invention can be connected, via the connection means according to the invention, to means for regeneration of the particle bed in form of gas suction means and/or gas insufflation means.

Gas suction means enable discharge of the particles accumulated on and in the filtration bed, via a gas suction achieved through at least one opening provided in the upper part of the enclosure, above the granular medium, at the level of the free volume surmounting the particle bed. Under the effect of the suction rate, an ascending convection gas movement is generated in the particle bed. The particles of the filtration bed are set in motion and fluidized without being entrained with the gas stream. The fibres smaller than the particles that make up the filtration bed are entrained with the ascending flow. Preferably, the gas of the gas suction means is air, which allows to use conventional suction means (such as a domestic or industrial vacuum cleaner), without requiring gas storage means or gas intake means other than a simple vent line. Advantageously, the gas suction means comprise or can be completed by a particle separation system arranged downstream from the gas suction means, such as a cyclone chamber or a membrane filter, for collecting the microfibre particles. It is noted that domestic vacuum cleaners generally comprise such particle separation systems. The empty space above the granular medium, which serves as an accumulation zone during the filtration phase, allows, during a bed regeneration phase, to contain the expansion of the bed associated with the fluidization thereof. After the bed regeneration phase, the suction flow is stopped and the particles settle so as to again form a new filter bed free of the fibres deposited during previous filtration phases. Advantageously, the fibres collected during a regeneration phase can either be used as recycling material or disposed of as non-hazardous waste in suitable collection systems.

In general, the velocity of the ascending gas during regeneration of the particle bed determines the agitation of the granular medium. It is well known to the person skilled in the art that, in order to set a particle bed in motion, the gas needs to rise through the granular bed with a velocity of flow greater than a velocity referred to as "minimum fluidization velocity", which can be calculated using correlations known to the person skilled in the art (for example as described in the document (Wen C. H. & Yu Y. H., Chem. Eng. Prog. Symp. Series, 82, 100-111 (1966)) and whose value depends on the properties of the granular medium (particle size, density). Preferably, during regeneration, the particle bed is fluidized by an ascending air movement, at a velocity through the bed preferably corresponding to a velocity of between 2 and 20 times the value of the minimum fluidization velocity, so as to promote agitation of the bed particles and thus to cause lift-off of the collected microfibres that leave the bed. More preferably, the velocity of the ascending air through the bed can range between 3 and 10 times the minimum fluidization velocity. In the case of a domestic washing machine washing between 5 and 10 kg laundry, this ascending gas velocity range makes it possible to ensure fluidization without requiring any specific suction means. In other words, this ascending gas velocity range is generally compatible with the characteristics of the majority of commercial vacuum cleaners available for household use.

Generally, the suction rate through the filter medium depends on the washing capacity of the textile treatment device. For example, if the textile treatment device comprises several washing machines, the suction rate through the filter medium depends on the number of washing machines and on the washing capacity (given in number of kg laundry for example) of each washing machine. The flow area of the filtration bed increases if the amount of liquid effluent to be filtered increases. The suction rate then needs to be adapted to enable fluidization of the medium. The height of the fluidized bed creates a pressure drop corresponding to the weight of the bed that must also be compatible with the characteristics of the suction regeneration means.

For a simple domestic washing machine with a washing capacity of between 5 and 10 kg laundry, the system can be dimensioned so as to have suction rates close to 10 to 100 l/s, preferably ranging between 20 and 40 l/s, allowing to generate a suction vacuum of between 5 and 50 kPa, preferably between 20 and 40 kPa. These characteristics are compatible with the characteristics of the majority of commercial vacuum cleaners available for household use. In cases where the system according to the invention is positioned downstream from industrial laundries or downstream from a set of washing machines, a specific suction system characterized by higher suction rates and velocities can be preferred.

According to an embodiment of the invention wherein a gas other than air is used in the means for regeneration by fluidization of the granular medium by gas suction, the means for connection to the means for regeneration by fluidization of the granular medium can further comprise an additional opening provided in the lower part of the enclosure, under the granular medium support, which can be connected to means for delivery of the gas used for regeneration.

According to an implementation of the invention wherein gas suction means are used to regenerate the granular medium and for which the gas used is air, and in case of total sealing of the connection between the liquid effluent discharge means and a wastewater discharge means external to the system according to the invention, the means for connection to the gas suction means can comprise an additional opening provided in the lower part of the enclosure, under the granular medium support. This additional opening can be connected to a vent line. Such an additional opening is not necessary when the connection between the liquid effluent discharge means and a wastewater discharge system external to the system according to the invention is not airtight, for example when the connection is achieved through an open siphon. Indeed, in this case, suction can occur directly through the opening of the liquid effluent discharge means, without the need for a vent line. Advantageously, the microfibre filtration system can further comprise a gas distributor, arranged between the granular medium and the opening allowing delivery of the gas of the gas suction means (i.e. the additional opening described above, or the opening of the liquid effluent discharge means). A gas distributor provides homogeneous distribution of a gas. According to an implementation of the invention, the gas distributor can be a perforated plate. Advantageously, the orifices of the perforated plate are so dimensioned that the pressure drop generated upon flow of the gas through the orifices leads to an even distribution of the gas at the distributor outlet. According to another variant of the invention, the system according to the invention can be connected, via the connection means according to the invention, to means for regenerating the particle bed in form of gas insufflation means, such as air overpressure or compression means. According to this design, the means for connection to the means for regeneration by fluidization of the granular medium can further comprise an additional opening, arranged in the lower part of the enclosure, under the granular medium support, which can be connected to gas insufflation means. A gas is thus fed into the lower part of the enclosure, under the granular medium, at a higher pressure than the pressure in the filtration system, which generates an ascending gas flow through the granular medium. The bed particles thus set in motion release the microfibres retained in the granular medium, which can then be discharged through the opening of the means for connection to the means for regeneration by fluidization of the granular medium provided in the upper part of the enclosure already described above.

FIG. 2*c* shows a variant of the embodiment of FIG. 1, identical in all respects to this first embodiment (the common elements will therefore not be described again), and wherein the means for connection to the means for regeneration by fluidization of said granular medium further comprise an additional opening 130 provided in the lower part of the enclosure, under support 20 of granular medium 30, which can be connected, via pipe 130', to gas insufflation and/or gas delivery means (not shown). In the case of gas insufflation means, an air compressor (not shown) arranged upstream from pipe 130' can allow air to be fed at a pressure higher than the pressure in granular medium 30, and the air flowing through granular medium 30 can flow out through opening 120. Pipe 130' can alternatively be a suction gas intake pipe, such as a vent line in the case of gas suction means where the regeneration gas is air. Additional opening 130 or pipe 130' preferably comprise a non-return valve (not shown).

Advantageously, the system according to the invention can further comprise means for accelerating the filtration by carrying out suction of the filtered liquid effluent (i.e. after passage through the granular medium), these means being arranged downstream from the granular medium. These means for creating suction of the liquid effluent through the granular medium can comprise a first pipe connected to an additional opening provided in a part of the enclosure located under the granular medium, the first pipe being connected to a second pipe through which the water can be flowing during filtration, this second pipe comprising a portion of smaller diameter so as to create suction through Venturi effect in the first pipe. This second pipe through which the water can be flowing can be, for example, the water filling pipe of a washing machine. Indeed, in the case of a washing machine equipped with the system according to the invention, the draining phase is shorter than the liquid effluent filtration phase through the granular medium. Thus, when the washing machine moves to the next cycle (a textile wash cycle comprises several wash/rinse cycles), at the end of a drain cycle, the washing machine fills with water again while the filtration phase is still in progress: it is then possible to use the water filling phase of the washing machine to create a Venturi suction effect so as to accelerate this filtration. The filtration acceleration means can also include a vacuum cleaner, a vacuum ejector or a vacuum pump arranged along an additional pipe positioned downstream from the granular medium.

Advantageously, the means for discharging the liquid effluent from the system according to the invention further comprise a circuit external to the enclosure, connected to said enclosure, for bypassing the granular medium in case of liquid effluent accumulation in the free volume of the enclosure, above the granular medium. In other words, according to this design, a part of the liquid effluent that may have accumulated above the granular medium (in case of excessive liquid effluent flow rate in relation to the filtration rate of the granular medium and/or in case of granular medium clogging) is discharged through this short-circuit external to the enclosure, so as to avoid backflow of the liquid effluent through the openings provided in the upper part of the enclosure. Advantageously, the connection of this external short-circuit comprises an opening above the granular medium through which part of the liquid effluent (above the opening level) can be discharged, and an opening under the granular medium, so that this part of the liquid effluent is discharged from the system according to the invention through the opening provided in the lower part of the enclosure, under the granular medium. Advantageously, as described below, this external short-circuit pipe can also be equipped with a 2-way valve or a non-return valve preventing gas backflow in the ascending vertical direction during a granular medium regeneration phase. Preferably, the opening of this external short-circuit located above the granular medium can be advantageously positioned above any device allowing the distribution of the liquid effluent flow to be modified, such as a grid, a jet regulator or, more generally, a liquid distributor.

Alternatively, the liquid effluent discharge means of the system according to the invention further comprise a pipe running through at least the granular medium to allow discharge of a liquid effluent accumulation in the free volume of the enclosure above the granular medium. In other words, according to this design, a part of the liquid effluent that may have accumulated above the granular medium (in case of excessive liquid effluent flow rate relative to the filtration rate of the granular medium and/or in case of granular medium clogging) enters through an opening of this pipe located above the granular medium and it is discharged through an opening of this pipe located under the granular medium. This pipe, which acts as an internal short-circuit, allows to prevent backflow of the liquid effluent through the openings located in the upper part of the enclosure. Preferably, the pipe according to this design is preferably provided with a deflector in the upper part thereof to prevent the liquid effluent entering through the upper part of the enclosure from directly entering this pipe. Advantageously, as described below, this internal short-circuit pipe can also be provided with a non-return valve preventing gas backflow in the short-circuit in the ascending vertical direction during a granular medium regeneration phase.

According to an implementation, the internal and/or external short-circuits as described above can comprise a liquid detector, preferably connected to an alarm. Such a detector allows to detect the presence of water circulating in the short-circuit, which may be an indicator that it is advisable to carry out a granular medium regeneration phase since at least part of the liquid effluent is no longer filtered by the system according to the invention. This liquid detector can for example consist of two metal branches separated by a few millimeters, positioned inside a pipe of a short-circuit and supplied with electricity (for example by means of a battery, a cell or a connection to a power network). When water passes between the two branches, the electric current is established and can trigger an alarm, visual and/or acoustic for example. The visual signal can be advantageously maintained over time, i.e. even after passage of the water through the short-circuit pipe, so as to alert the user if they were not present when the alarm was triggered.

Very preferably, the system according to the invention further comprises a chamber arranged upstream from the enclosure and connected thereto by the means for passage by percolation of the liquid effluent through the granular medium, this chamber serving as a tank for a liquid effluent accumulation during drain. This accumulation tank allows to delay filtration by reducing the velocity of filtration of the liquid effluent through the granular medium, depending on the operating conditions or on the clogging conditions. This liquid effluent accumulation tank, upstream from the enclosure on the path of the liquid effluent, makes it possible to use an enclosure for the system according to the invention that is less bulky, and the free volume of the enclosure above the granular medium then needs to be essentially dimensioned to enable fluidization of the granular medium during the regeneration phase. Furthermore, this liquid effluent accumulation chamber can have any shape and it can be arranged at any location on the drain pipe of a textile treatment device, so that it can be positioned in any available space of the textile treatment device provided that this available space is substantially located above the enclosure and allows the liquid to flow by gravity.

FIG. 2*d* shows a variant of the embodiment of FIG. 1, identical in all respects to this first embodiment (the common elements will therefore not be described again), except for an external short-circuit 140, in form of a pipe external to enclosure 10, belonging to the liquid effluent discharge means of the system according to the invention. According to this variant, external short-circuit 140 connects the upper part of free volume 40 of enclosure 10 to the lower part of enclosure 10 located under support 20 of granular medium 30. This allows to avoid backflow of the liquid effluent through the two openings 100, 120 provided in the upper part of the enclosure. For this variant, a 2-way valve 53 is arranged on line 140 to prevent gas backflow in the ascending vertical direction during a granular medium regeneration phase. 2-way valve 53 can be advantageously replaced by a non-return valve (not shown).

Figure 2E:
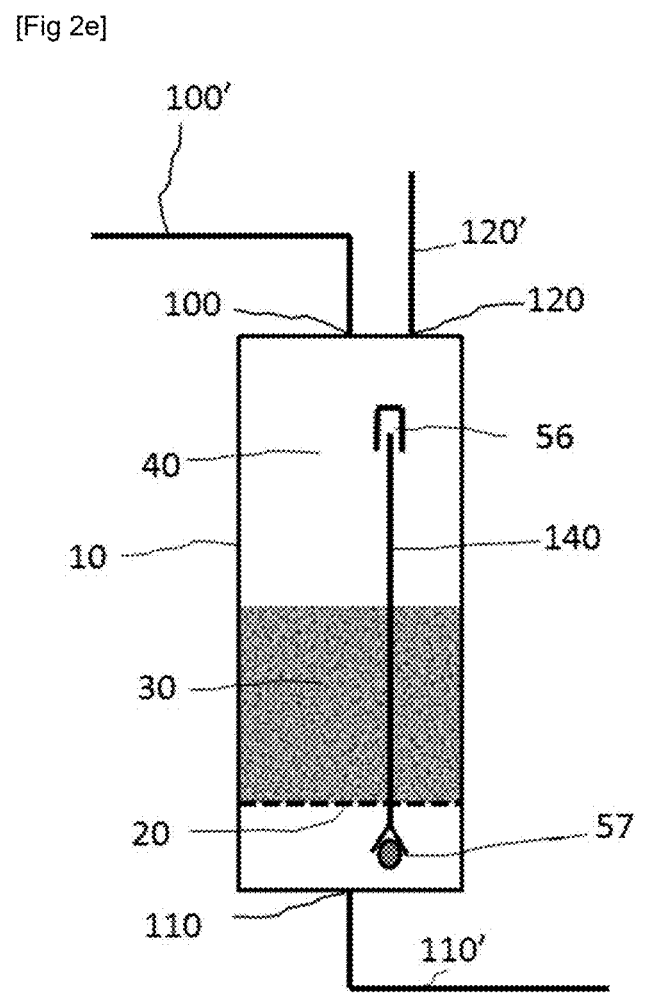

FIG. 2*e* shows a variant of the embodiment of FIG. 1, identical in all respects to this first embodiment (the common elements will therefore not be described again), except for a short-circuit 140 internal to the enclosure, in form of an internal pipe belonging to the liquid effluent discharge means of the system according to the invention. According to this variant, internal short-circuit 140 comprises a pipe directly connecting the upper part of free volume 40 of enclosure 10 to the lower part of the enclosure located under support 20 of granular medium 30. This allows to avoid backflow of the liquid effluent through the two openings 100, 120 provided in the upper part of the enclosure. For this variant, the internal circuit is surmounted by a deflector 56 preventing the liquid effluent entering through opening 100 from directly flowing into internal short-circuit 140. Also, the internal circuit 140 according to this variant is provided with a non-return valve 57 preventing gas backflow in pipe 140 in the ascending vertical direction during a granular medium regeneration phase.

Figure 2F:
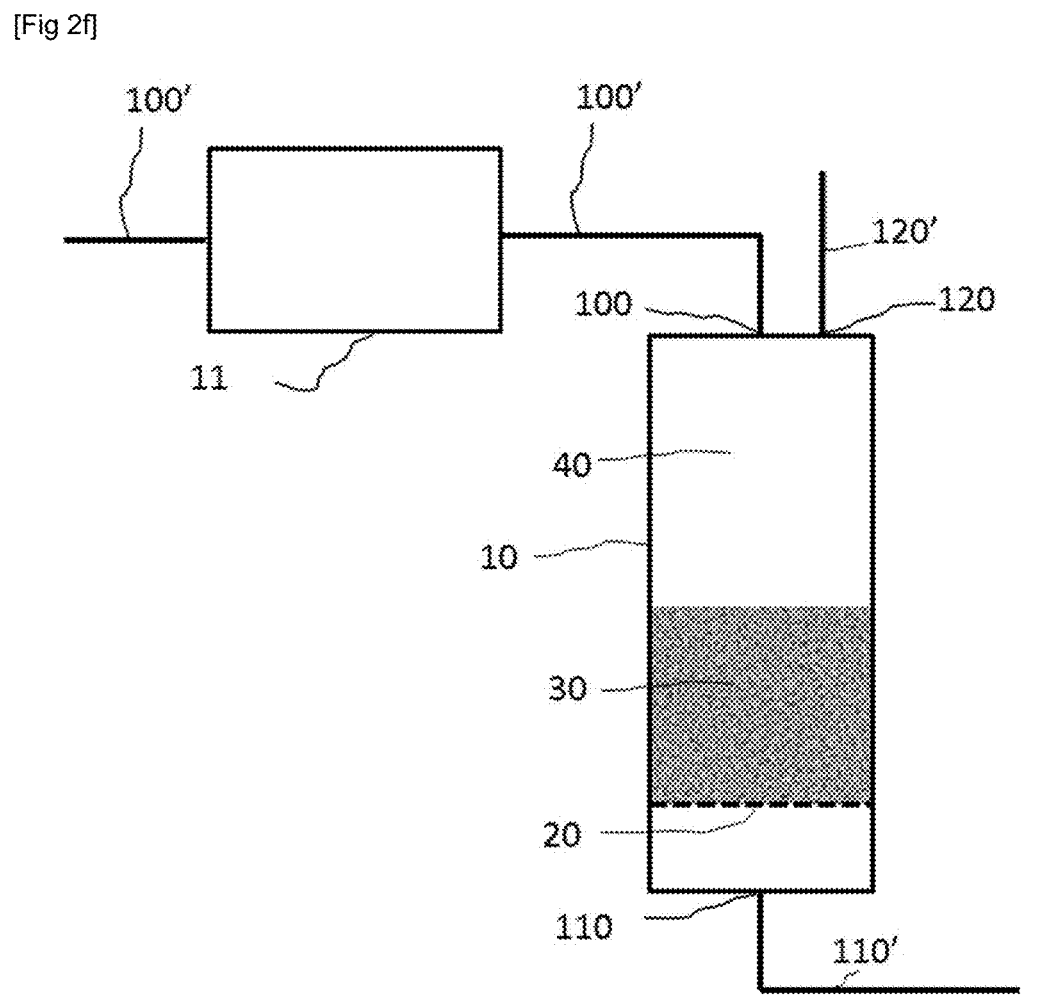

FIG. 2*f* shows a variant of the embodiment of FIG. 1, identical in all respects to this first embodiment (the common elements will therefore not be described again), except for an additional chamber 11 arranged upstream from enclosure 10, along drain pipe 100' leading to opening 100 of the means for passage by percolation of the liquid effluent through granular medium 30. This chamber 11 contributes to delaying the filtration by reducing the velocity of filtration of the liquid effluent through granular medium 30, depending on the operating conditions or on the clogging conditions. This prevents backflow of the liquid effluent through the two openings 100, 120 located in the upper part of enclosure 10 if the flow rate in the filtration bed is lower than the drain flow rate. The flow between chamber 11 and enclosure 10 occurs essentially by gravity, chamber 11 being arranged substantially above enclosure 10.

According to an embodiment, the system according to the invention further comprises means for controlling the means for passage by percolation of the liquid effluent through the granular medium and/or said liquid effluent discharge means and/or means for connection to said means for regeneration by fluidization of said granular medium. These control means can comprise 2-way valves, 3-way valves, rotary 6-way valves and/or non-return valves. Such control means allow the two phases of the method according to the invention to be controlled: 1) during the filtration phase, only the liquid effluent can enter and leave the enclosure, and only via the means for passage by percolation of the effluent liquid through the granular medium and the liquid effluent discharge means; 2) during the regeneration phase, only the gas of the means for regeneration by fluidization of the granular medium can circulate in the enclosure. Combinations of these control means are of course possible. Various non-limitative and non-exhaustive configurations are presented in FIGS. 3 to 7*b*.

Figure 3:
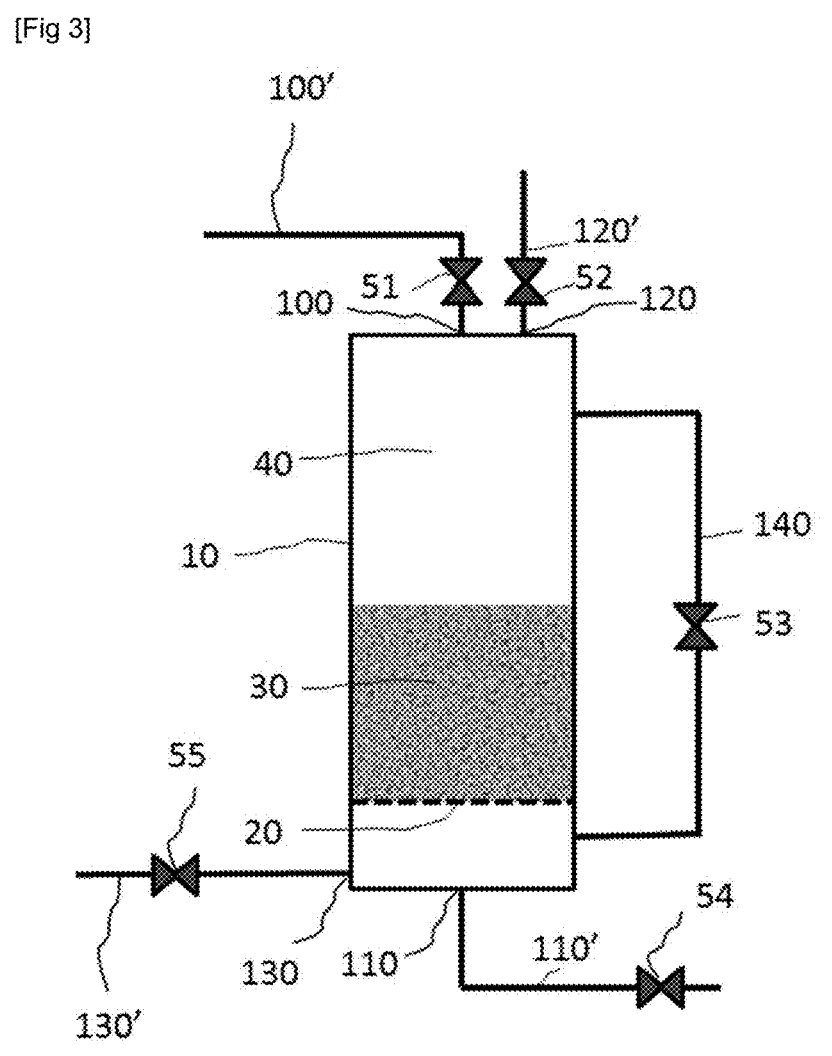

FIG. 3 schematically illustrates, by way of non-limitative example, an embodiment of the invention comprising an external short-circuit 140 (as described in FIG. 2*d*) and additional means for connection to the means for regeneration by fluidization of said granular medium 130, 130' (as described in FIG. 2*c*), and comprising 2-way valves 51, 52, 53, 54, 55 provided on each pipe 100', 110', 120', 130' respectively connected to openings 100, 110, 120, 130 of the enclosure, and on external short-circuit 140. Valves 51, 52, 54, 55 allow to open or to close openings 100, 110, 120, 130 respectively during the filtration or regeneration phases. During the regeneration phase, the gas is prevented from flowing through external short-circuit 140 by means of valve 53 located on the short-circuit. 2-way valve 53 can be advantageously replaced by a non-return valve (not shown).

Figure 4:
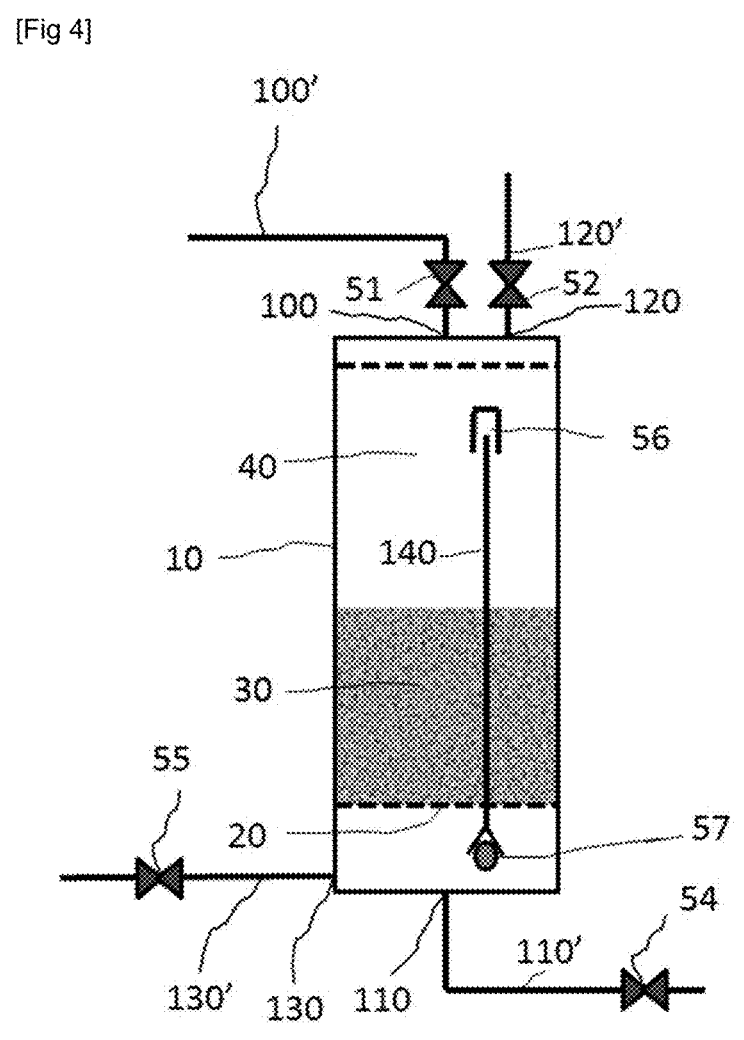

FIG. 4 schematically illustrates, by way of non-limitative example, an embodiment of the invention comprising an internal short-circuit 140 (as described in FIG. 2*e*) and additional means for connection to the means for regeneration by fluidization of said granular medium 130, 130' (as described in FIG. 2*c*), wherein 2-way valves 51, 52, 54, 55 are provided on each pipe 100', 110', 120', 130' respectively connected to openings 100, 110, 120, 130 of the enclosure, and a non-return valve 57 is arranged at the base of internal short-circuit pipe 140. Valves 51, 52, 54, 55 allow to open or to close openings 100, 110, 120, 130 respectively during the filtration or regeneration phases. Non-return valve 57 allows to prevent gas backflow through pipe 140 in the ascending vertical direction during a regeneration phase of granular medium 30.

FIG. 5 schematically illustrates, by way of non-limitative example, an embodiment of the invention comprising additional means for connection to the means for regeneration by fluidization of said granular medium 130, 130' (as described in FIG. 2*c*), wherein openings 100, 120 of the means for passage by percolation of the liquid effluent through granular medium 30 and means for connection to means for regeneration by fluidization of the granular medium are common, and wherein a 3-way valve 58 is arranged at the junction of pipes 100', 120', 120" and 130" to control the fluid passing through these pipes 100', 120', 120", 130" according to the phase in progress in the method according to the invention, i.e. to allow only passage of the liquid effluent in elements 100, 100' and 100" during the filtration phase and to allow only passage of the gas in elements 120, 120', 120" during the regeneration phase. According to this non-limitative embodiment, non-return valves 59, 60 are also arranged on each pipe 110', 130' respectively connected to openings 110, 130 of the lower part of enclosure 10, so as to enable discharge of the liquid effluent only through opening 110, and gas intake or insufflation only through opening 130.

FIG. 6 schematically illustrates, by way of non-limitative example, a variant of FIG. 5 wherein openings 110, 130 of the liquid effluent discharge means and the means for connection to the means for regeneration by fluidization of the granular medium are also common, and wherein a 3-way valve 61 is arranged at the junction of pipes 110', 130', 110", 130" to control the fluid passing through these pipes 110', 130', 110", 130" according to the phase in progress in the method according to the invention. Thus, in this variant, using 3-way valves 58, 61 allows the system according to the invention to be used in filtration phase or in regeneration phase. More precisely, in filtration phase, valve 58 opens opening 100 and closes opening 120, valve 61 opens opening 110 and closes opening 130. In regeneration phase, valve 58 opens opening 120 and closes opening 100, valve 61 opens opening 130 and closes opening 110. Thus, passage of the liquid effluent is only possible during the filtration phase, and only in elements 100, 100', 100", 110, 110', 110", and passage of the gas is only possible during the regeneration phase, and only in elements 120, 120', 120", 130, 130', 130".

FIGS. 7*a* and 7*b* schematically illustrate, by way of non-limitative example, an implementation of the invention wherein the means for controlling the means for passage by percolation of the liquid effluent through the granular medium, the liquid effluent discharge means and the means for connection to the means for regeneration by fluidization are controlled by a rotary 6-way valve 62. For this embodiment, openings 100, 120 of the means for passage by percolation of the liquid effluent through the granular medium and of the means for connection to the means for regeneration by fluidization of the granular medium are common, as well as openings 110, 130 of the liquid effluent discharge means and of the means for connection to the means for regeneration by fluidization of the granular medium. FIG. 7*a* schematically illustrates, by dotted lines, the positions of elements 62*a*, 62*b*, 62*c* and 62*d* of 6-way valve 62 for connecting, during the filtration phase, only opening 100 to opening 110. FIG. 7*b* schematically illustrates, by dotted lines, the positions of elements 62*a*, 62*b*, 62*c* and 62*d* of 6-way valve 62 for connecting, during the regeneration phase, only opening 130 to opening 120.

Advantageously, the system according to the invention can further comprise a settling chamber and/or a cyclone separation chamber (such as a hydrocyclone), arranged upstream from the enclosure and connected thereto by the means for passage by percolation of the effluent liquid through the granular medium. A settling chamber allows gravity sedimentation of the larger fibres. A cyclone separation chamber (such as a hydrocyclone) allows the larger fibres to be separated by inducing vorticity and a centrifugal force field promoting separation. Such chambers, positioned upstream from the enclosure relative to the liquid effluent flow, can allow to capture the larger fibres and to limit too rapid clogging of the granular medium, which can then capture the majority of the smaller fibres more efficiently.

Preferably, the system according to the invention further comprises means for injecting at least one flocculant agent into the liquid effluent, so arranged as to enable flocculant agent injection into the liquid effluent before its enters the granular medium. The means for injecting at least one flocculant agent into the liquid effluent can be either arranged upstream from the enclosure and connected thereto by the means for passage by percolation of the liquid effluent through the granular medium, or arranged so as to enable injection into the free volume above the granular medium, via an opening provided in the upper part of the enclosure. In cases where the flocculant agent is in liquid form, the means for injecting at least one flocculant agent can comprise a tank comprising said at least one flocculant agent and means allowing the flocculant agent flow rate to be controlled. It is also possible, for example when the flocculant agent is in liquid or solid form, to mix the flocculant agent with the liquid in the textile treatment device, for example in admixture with the detergent in the case of a washing machine.

A flocculant agent allows to promote agglomeration of the smaller fibres, which facilitates their separation from the liquid effluent when passing through the granular medium. For example, it is possible to use a flocculant agent in form of polyvalent cation mineral salts such as alumina sulfate or ferric chloride, activated silica, or natural (starches, alginate) or synthetic (high molecular weight polymers such as polyacrylamides or polyvinylamines) organic polyelectrolytes. Injection of a flocculant agent is preferably performed in low proportions, generally ranging between 1 and 20 ppm of drain liquid, and a device promoting mixing of said flocculant agent in the liquid effluent is preferably used. Flocculation is particularly interesting when the microfibres have dimensions of the order of one micron or less.

FIG. 8 illustrates an embodiment of the system according to the invention comprising a granular medium consisting of three staged particle beds 30*a*, 30*b*, 30*c* arranged on three supports 20*a*, 20*b*, 20*c*, each bed 30*a*, 30*b*, 30*c* being surmounted by a free volume 40*a*, 40*b*, 40*c*. Opening 120 provided in the upper wall of enclosure 10 is intended to be connected to means for regeneration by fluidization of the granular medium (not shown).

The invention further relates to a method for filtering microfibres contained in a liquid effluent, which can be advantageously implemented by means of the system for filtering microfibres contained in a liquid effluent according to any one of the embodiments or embodiment combinations described above.

The method according to the invention comprises at least the following steps:

A) carrying out at least one phase of filtering the microfibres contained in the liquid effluent, the filtration phase comprising at least passage of the liquid effluent through the granular medium through the agency of at least the means for passage of the liquid effluent through the granular medium described above, and discharge of the thus filtered liquid effluent through the agency of the means for discharging the liquid effluent described above, B) carrying out a phase of regeneration by fluidization of the granular medium by connecting the means for connection to the means for regeneration by fluidization of the granular medium described above with means for regeneration by fluidization of the granular medium, such as gas suction means or gas insufflation means.

Advantageously, step A) is repeated between 20 and 150 times, preferably about 100 times prior to carrying out step B). Indeed, it is important to perform regular regeneration of the filter medium in order to prevent clogging, but it is not necessary to perform a regeneration phase systematically after each filtration phase, depending on the microfibre load in the liquid effluent. A regeneration phase trigger frequency can for example be estimated by estimating a rate of plugging of the filter bed pores through microfibre accumulation, from the microfibre concentration in the liquid effluent after each laundry. This embodiment, by avoiding systematic regeneration phases, notably allows to save energy.

Preferably, a phase of regeneration by fluidization of the granular medium is carried out after a plurality of filtration phases, when it is detected that the percolation rate of the liquid effluent slows down. According to an implementation, a granular medium regeneration phase can be started as follows: for each filtration phase, the variation of the liquid effluent level in the free volume above the granular medium is measured over time; this measurement is compared with a reference value of the percolation rate, obtained for example by measurement when the granular medium is free of microfibres; when the measurement is at least 100% less than the reference value, or preferably at least 50% less than the reference value, a phase of regeneration by fluidization of the granular medium is carried out at the end of the filtration phase in progress.

Preferably, the phase of regeneration by fluidization of the granular medium may be triggered only after a predetermined time from the end of the last filtration phase, allowing at least drainage of the liquid effluent and preferably also drying of the granular medium in order to remove all the humidity contained in the granular medium. This predetermined time can range between 3 and 7 hours, preferably 5 hours. According to an implementation of the invention, to promote drying, natural or forced gas convection through the granular medium can also be established, by keeping the openings of the liquid effluent discharge means and of the means for connection to the means for regeneration by fluidization of the granular medium open. The predetermined time is advantageously limited when hydrophobic particles are used and/or when the filter is manufactured with a hydrophobic material.

Advantageously, the method according to the invention can comprise, prior to step B), a granular medium drainage phase carried out using gas suction means connected to the system according to the invention, so as to generate a descending gas flow through the granular medium. In other words, the gas suction means are connected to the system according to the invention at an opening located under the granular medium, preferably above the lower wall of the enclosure. According to an implementation of the invention, the gas suction means can be connected to the opening of the liquid effluent discharge means or, alternatively, when there is one, to the additional opening of the means for connection to the means for regeneration by fluidization of the granular medium described above. Gas suction through an opening located in the lower part of the enclosure enables forced downward gas convection through the granular medium. This forced gas convection entrains a large part of the residual liquid present in the interstices of the granular medium, thus facilitating its gravity flow and allowing the residual humidity of the bed to be reduced. Under these conditions, with the help of the gas circulation, it is thus possible to reduce the volume fraction of liquid in the bed to a content of less than 10%, or even to entirely dry the bed if the time required for this step is sufficiently long. Thus, this gas circulation facilitates gravity flow of the liquid effluent trapped in the granular medium prior to carrying out regeneration of the granular medium. Preferably, the opening to which the gas suction means are connected is located at a higher level than the level of the lower wall of the enclosure, and it comprises a deflector for preventing the drained liquid effluent from entering the gas suction means. Advantageously, the system according to the invention can comprise means for collecting the drained liquid effluent (such as water traps), located upstream from the opening connected to the gas suction means, to avoid excessive liquid entrainment to the gas suction means, such liquid entrainment being likely to impair the proper functioning of these gas suction means.

Advantageously, the method according to the invention can comprise, prior to step B) and preferably after a drainage phase as described above, a granular medium drying phase carried out with means for increasing the temperature of the granular medium. This drying phase provides accelerated drying, compared to a drainage phase as described above that would be carried out over a sufficiently long time to result in drying of the granular medium. According to an implementation of the invention, this granular medium drying phase can be carried out by connecting gas insufflation means to the system according to the invention so as to generate an ascending or descending gas flow through the granular medium, and by heating the gas prior to allowing it into the enclosure. The gas can for example be heated using a heat source (for example a heating resistor, a heat exchanger) located between the gas insufflation means and the opening to which the gas insufflation means are connected. According to this embodiment, the gas insufflation means can be connected to the system of the invention at the level of the opening of the means for regeneration by fluidization of the granular medium provided above the granular medium, or at the additional opening located under the granular medium support as described above, or any other opening. Preferably, the gas used is a gas with a low water vapour content. According to a design of this implementation of the invention, the gas insufflation means can consist of a hair dryer. According to another embodiment of the invention, this granular medium drying phase can be carried out by increasing the temperature of the granular medium by percolating a hot liquid through the granular medium, or by heating the walls of the granular medium. Heating the granular medium wall can for example be achieved by placing a heating resistor in contact with the granular medium wall, or even in the wall of the granular medium. Advantageously, the granular medium is heated to temperatures ranging between 30° C. and 90° C., preferably ranging between at least 50° C. and 70° C. Such temperatures can allow evacuation of more than 95% of the residual humidity present in the granular medium at the start of the drying process, in less than 30 minutes, or even less than 10 minutes.

FIG. 9 shows a variant of the embodiment of FIG. 1 (the common elements are therefore not described again), configured to implement a granular medium drainage phase, followed by a granular medium drying phase, prior to regenerating the granular medium. For this configuration, an additional opening 130 is provided in the enclosure at a higher level than the lower wall of the enclosure, this opening 130 being intended to be connected to gas suction means (not shown) by pipe 130'. Besides, this opening 130 is surmounted by a deflector 130" allowing diversion of the liquid gravity flow, through granular medium 30, around opening 130, while allowing passage of the gas that is much less affected by the effects of gravity. Pipe 110' allowing to connect opening 110 to a wastewater discharge system (not shown) is provided with a valve 111 allowing discharge (open valve) of the liquid effluent accumulated before and during the drainage phase.

More precisely, during the granular medium drainage phase, the system is connected to the gas suction means through opening 130 and line 130', the air being sucked in from the ambient medium through opening 120. Suction being in operation, the bed is traversed by a gas stream at a velocity preferably ranging between 0.1 and 5 m/s, more preferably between 0.3 and 3 m/s. The gas promotes the flow of liquid accumulated in the granular medium during the successive filtration phases. The residual liquid thus flows through granular medium 30 and support 20, and it accumulates around pipe 130' under opening 130 in the space located in system 10 under support 20. After drainage, which can last a few minutes, gas suction is stopped. The liquid accumulated around pipe 130' is discharged through pipe 110 by opening valve 111.

The granular medium that has undergone drainage is then dried prior to being regenerated. In this configuration, the gas suction means can be kept connected to opening 130 and a hair drier (not shown) can be connected to opening 120 through pipe 120'. Ambient air heated to about 50° C. then enters the system through opening 120, it flows through the filter medium, yielding its heat thereto, and becomes progressively laden with the humidity resulting from the evaporation of water governed by the local thermodynamic equilibrium conditions.

Once this drying phase performed, regeneration of the granular medium is carried out in the absence of excessive humidity likely to interfere with the fluidization of particles. The gas suction means are then connected to opening 120, the gas intended to fluidize the granular medium flowing in through opening 110.

According to an implementation of the invention, the filtration and/or regeneration phases are controlled by the control means of the microfibre filtration system described above, for example by means of 2-way valves, 3-way valves, rotary 6-way valves and/or non-return valves, as described above, and in particular in the embodiments of FIGS. 3 to 7*b*.

Advantageously, the method according to the invention comprises at least one preliminary (i.e. prior to step A) step of pretreating the liquid effluent before it reaches the granular medium.

According to an implementation of the invention, this preliminary liquid effluent pretreatment step can comprise a sub-step of injecting at least one flocculant agent into the liquid effluent, using for example the flocculant agent injection means described above. A flocculant agent promotes agglomeration of the smaller fibres, which facilitates their separation from the liquid effluent upon passage through the granular medium. It is possible, for example, to use a flocculant agent in form of polyvalent cation mineral salts such as alumina sulfate or ferric chloride, activated silica, or natural (starches, alginate) or synthetic (high molecular weight polymers such as polyacrylamides or polyvinylamines) organic polyelectrolytes. Injection of a flocculant agent is preferably performed in low proportions, generally ranging between 1 and 20 ppm of drain liquid, and a device promoting mixing of said flocculant agent in the liquid effluent is preferably used. Flocculation is particularly interesting when the microfibres have dimensions of the order of one micron or less. The flocculant agent can also be injected simultaneously with the detergent intended for washing the textiles, and it can possibly be combined with the detergent.

Alternatively or cumulatively, the preliminary step of pretreating the liquid effluent can comprise a sub-step of liquid effluent settling, carried out for example by means of a settling chamber arranged upstream from the enclosure of the system according to the invention as described above. A settling chamber allows gravity sedimentation of the larger fibres. Such a preliminary settling sub-step can allow to capture the larger fibres and to limit too rapid clogging of the granular medium, which can then capture more efficiently the majority of the smaller fibres.

Alternatively or cumulatively, the preliminary step of pretreating the liquid effluent can comprise a sub-step of passing the liquid effluent into a cyclone separation room (such as a hydrocyclone) arranged upstream from the enclosure of the system according to the invention as described above. A cyclone separation room (such as a hydrocyclone) allows to separate the larger fibres by inducing vorticity and a centrifugal force field promoting separation. Such a preliminary sub-step can allow to capture the larger fibres and to limit too rapid clogging of the granular medium, which can then capture the majority of the smaller fibres more efficiently.

Advantageously, the preliminary step of pretreating the liquid effluent can comprise a sub-step of injecting at least one flocculant agent into the liquid effluent, followed by a liquid effluent settling sub-step and/or a cyclone separation sub-step. The flocculant agent promotes agglomeration of the smaller fibres, which increases the efficiency of the settling and/or cyclone separation sub-step, prior to passage of the liquid effluent, already free of the larger fibres and/or fibre agglomerates, through the granular medium. Advantageously, the method according to the invention further comprises at least one step subsequent to the regeneration step, consisting in collecting the microfibres from the regeneration phase, for example by means of a cyclone chamber or a filter (a membrane filter for example) arranged downstream from the means for regeneration by fluidization of said granular medium described above.

Thus, the system and the method according to the invention allow filtration of microfibres in a liquid effluent, resulting from the wash, rinse and/or spin cycles of a textile treatment device, with a capture efficiency for microfibres larger than 50 microns above at least 80%. The system and the method according to the invention require no consumables and they can be used over long periods, thanks to the possibility of regenerating the granular medium in which microfibres may accumulate over time.

The invention also relates to a textile washing device, such as a washing machine, comprising at least one system for filtering the microfibres contained in a liquid effluent according to any one of the embodiments described above.

It goes without saying that the invention is not limited to the embodiments of the system and of the method described and illustrated above by way of example, and that it encompasses on the contrary all variant embodiments and all combinations of these embodiments so as to combine the effects thereof. For example, the embodiments of FIGS. 2a to 2f can be combined. These embodiments can also be combined with the embodiments of FIGS. 3 to 6, and/or of FIGS. 7a to 7b and/or of FIG. 8. These embodiments can also be combined with the embodiment of FIG. 9.

Example

The application example described hereafter relates to an application of the microfibre filtration system and method according to the invention to an individual washing machine.

More precisely, the washing machine of this example has a washing capacity of 5 kg of laundry and it uses, for each wash, a maximum total amount of water of 50 l. The wastewater discharge cycles during the different programme phases vary according to the user's selections, but the washing machine is characterized by the fact that the largest amount that can be discharged during a wash phase is 15 l, the liquid being discharged in 3 min. The time between two washing machine discharge cycles is about 15 min minimum. The average fibre content of the wastewater is close to 0.02 g/l, corresponding to an average fibre release rate of 0.02% relative to the weight of washed laundry, and to an average amount of fibres to be collected by the filter at each wash of 1 g on average for 5 kg washed laundry.

The washing machine discharges the drain liquids through a discharge point located at the base of the washing machine, 5 cm from the floor. A connection point to the main sewage system is available at a height of 15 cm above the washing machine discharge point (therefore 40 cm above the floor on which the machine rests).

For this application example, the filtration system according to the design described in FIG. 5 is directly incorporated in the washing machine. The references mentioned hereafter therefore correspond to those of FIG. 5. For this application example, enclosure 10 containing granular medium 30 is cylindrical, 25 cm in inside diameter and 60 cm in height. Granular medium 30 is arranged over a height of 25 cm in enclosure 10. It is surmounted by a 30-cm high free volume 40 whose volume enables accumulation of 15 l liquid effluent. The granular medium rests on a support 20 in form of a grid whose mesh size is 0.15 mm. Below the grid, a 50-mm empty space allows the liquid to be collected under the filter bed. Granular medium 30 consists of sand whose average diameter is 0.5 mm, and 90% of the sand particles have a size ranging between 0.3 and 0.7 mm. The average density of the sand grains is estimated at 2550 kg/m$^3$. The porosity (interstitial space) of granular medium 30 is estimated at 41% of the granular volume after regeneration.

A short-circuit pipe of 10 mm in inside diameter and 12 mm in outside diameter, provided with a non-return valve, runs through the bed (as shown in FIG. 4).

The filtration system according to this application example is connected to the washing machine by a hose 100' connecting washing machine drain pipe 100" to 3-way valve 58 located at a high point 105 cm above the washing machine discharge outlet, i.e. 110 cm from the floor. Opening 110 is thus arranged above the washing machine discharge outlet, which allows to connect opening 110 to the usual wastewater discharge system, with a siphon, and to discharge the filtered rinsing liquid by gravity.

Initially, 3-way valve 58 is in a position allowing the drain liquid to be filtered, in other words, opening 100 is open and opening 120 is closed. When granular medium 30 is clean, just after regeneration, the characteristics of the bed enable filtration at a rate of 6 l/min by creating a pressure drop below 2000 Pa, corresponding to a hydrostatic height 20 cm less than the height of free volume 40. Therefore, filtration through percolation of the bed can be carried out in less than 4 min. When granular medium 30 is clogged after accumulation of about 100 g microfibres, the pressure drop has doubled and corresponds to about 4000 Pa, i.e. a hydrostatic height of 40 cm, still below the height of free volume 40. These characteristics ensure efficient filtration of the drain liquid for about a hundred washes.

After about a hundred washes, 3-way valve 58 is actuated to regenerate the filter medium. After the last wash, opening 100 is closed and opening 120 is opened. After waiting 5 hours to allow drainage and drying of granular medium 30, opening 120 is connected to a commercial vacuum cleaner provided with a disposable filter bag, allowing to create an ascending convective air flow through granular medium 30, the air entering through opening 130 provided with non-return valve 59 that opens, opening 110 being automatically closed by means of non-return valve 60. The vacuum cleaner allows to suck 30 l/s with a suction of 40 kPa. The fluidization velocity of the particles is 19.5 cm/s. A minimum flow rate of 10 l/s is therefore required to fluidize the bed. Using the vacuum cleaner with a suction power of 30 l/s thus allows to fluidize the bed at a velocity corresponding to 3 times the minimum fluidization velocity. The suction required to compensate for the pressure drop of the granular medium in the fluidized state is about 4000 Pa, which is much less than the suction capacity of the vacuum cleaner. The bed is therefore well fluidized, which allows the microfibres to be discharged into the filter bag. After regeneration, suction is stopped and the sand particles settle so as to form the filter medium again. 3-way valve 58 is actuated so as to return to the filtration phase, i.e. opening 100 is opened and opening 120 is closed.

The microfibre filtration system and method according to this design have allowed to remove between 80% and 90% of the fibres longer than about 50 microns.

The dimensions of the filtration system described in the application example could be reduced by optimizing the operating conditions of the washing machine, for example by considering more frequent draining, but of smaller volume.

The invention claimed is:

1. A system for filtering microfibres contained in a liquid effluent from a textile treatment device, the system being intended to be connected to a drain pipe of the textile treatment device, the system comprising at least:

- an enclosure comprising a granular medium occupying a portion of the space of the enclosure, the granular medium being arranged on a support so as to leave a free volume in the enclosure above the granular medium, the support being permeable to at least the liquid effluent,
- means allowing passage by percolation of the liquid effluent through the granular medium, comprising at least one opening provided in the enclosure and arranged above the granular medium,
- wherein the granular medium is configured to retain at least a part of microfibres contained in the liquid effluent percolating therethrough,
- means for discharging the liquid effluent, comprising at least one opening provided in the enclosure and arranged under the support of the granular medium, and
- means for connection to means for regeneration by fluidization of the granular medium, comprising at least one opening provided in the enclosure and arranged above the granular medium, the means for regeneration by fluidization comprising means for gas suction.

2. A system as claimed in claim 1, wherein the means for discharging the liquid effluent comprise a circuit external to the enclosure, connected to the enclosure to bypass the granular medium in case of accumulation of the liquid effluent in the free volume of the enclosure above the granular medium.

3. A system as claimed in claim 1, wherein the means for discharging the liquid effluent comprise a pipe running through at least the granular medium so as to bypass the granular medium in case of accumulation of the liquid effluent in the free volume of the enclosure above the granular medium.

4. A system as claimed in claim 2, wherein the circuit external to the enclosure further comprises a liquid detector.

5. A system as claimed in claim 3, wherein the pipe of the means for discharging the liquid effluent further comprises a liquid detector.

6. A system as claimed in claim 1, further comprising means for controlling the means for passage by percolation of the liquid effluent through the granular medium and/or the means for discharging the liquid effluent, and/or the means for connection to the means for regeneration by fluidization of the granular medium.

7. A system as claimed in claim 6, wherein the control means comprise at least one 2-way valve and/or at least one 3-way valve and/or at least one non-return valve and/or a rotary 6-way valve.

8. A system as claimed in claim 1, further comprising a settling chamber and/or a cyclone separation chamber and/or an accumulation chamber for the liquid effluent, arranged upstream from the enclosure and connected to the means for passage by percolation of the liquid effluent through the granular medium.

9. A system as claimed in claim 1, further comprising means for injecting at least one flocculant agent into the liquid effluent, the injection means being arranged for injection of the at least one flocculant agent into the liquid effluent upstream from the granular medium.

10. A system as claimed in claim 1, wherein the granular medium comprises sand particles, crushed glass beads or raw glass beads, particles based on natural or synthetic zeolite, alumina, or resins or plastic.

11. A system as claimed in claim 1, wherein the granular medium comprises particles with size ranging between 0.1 mm and 2 cm for at least 80 wt. % of the particles.

12. A system as claimed in claim 1, wherein a liquid distributor is arranged between the granular medium and the opening of the means for passage by percolation of the liquid effluent through the granular medium and/or, when the means for regeneration by fluidization of the granular medium comprise gas suction means, a gas distributor is arranged between the granular medium and an opening intended for intake of the gas of the gas suction means.

13. A method for filtering microfibres contained in a liquid effluent from a textile treatment device, the method being implemented by means of a system for filtering microfibres as claimed in claim 1, the method comprising at least the following steps:

- A) carrying out at least one phase of filtering the microfibres, the filtration phase comprising at least one passage by percolation of the liquid effluent through the granular medium through the agency of at least the means for passage by percolation of the liquid effluent through the granular medium, and discharge of the filtered liquid effluent through the agency of at least the means for discharging the liquid effluent,
- B) carrying out a phase of regeneration by fluidization of the granular medium by connecting the means for connection to the means for regeneration by fluidization of the granular medium with the means for regeneration by fluidization of the granular medium.

14. A method as claimed in claim 13, wherein step A) is repeated between 50 and 150 times prior to carrying out step B).

15. A method as claimed in claim 13 comprising, prior to step A), a step of pretreatment of the liquid effluent, the step of pretreatment of the liquid effluent comprising at least one injection of at least one flocculant agent into the liquid effluent and/or at least one settling of the liquid effluent and/or at least one cyclone separation of the liquid effluent.

16. A method as claimed in claim 13 comprising, prior to step B), a phase of draining the granular medium, carried out through the agency of gas suction means connected to the system so as to generate a descending gas flow through the granular medium, and/or a phase of drying the granular medium, carried out through the agency of means for increasing the temperature of the granular medium.

17. A method as claimed in claim 13, wherein the filtration and regeneration phases are controlled by means for controlling the means for passage by percolation of the liquid effluent through the granular medium and/or the means for discharging the liquid effluent, and/or the means for connection to the means for regeneration by fluidization of the granular medium.

18. A method as claimed in claim 13, further comprising at least one step subsequent to the phase of regeneration by fluidization, consisting in collecting the microfibres from the regeneration phase.

19. A textile washing device comprising at least one system for filtration of the microfibres contained in a liquid effluent as claimed in claim 1.

* * * * *